(12) United States Patent
Belagal Math et al.

(10) Patent No.: US 12,298,834 B2
(45) Date of Patent: May 13, 2025

(54) METHODS AND APPARATUS TO CONTROL AN AGGRESSIVENESS OF DISPLAY PANEL POWER SAVINGS AND FIDELITY

(71) Applicant: Intel Corporation, Santa Clara, CA (US)

(72) Inventors: Shravan Kumar Belagal Math, Bengaluru (IN); Chyuan-Tyng Wu, San Jose, CA (US); Vishal R. Sinha, Portland, OR (US); Paul S. Diefenbaugh, Portland, OR (US); Kunjal Parikh, Fremont, CA (US); Malhar N. Bhatt, Gandhinagar (IN)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 17/448,692

(22) Filed: Sep. 23, 2021

(65) Prior Publication Data

US 2022/0011848 A1   Jan. 13, 2022

(51) Int. Cl.
| | |
|---|---|
| G09G 5/00 | (2006.01) |
| G06F 1/3234 | (2019.01) |
| G06F 3/14 | (2006.01) |
| G09G 5/10 | (2006.01) |

(52) U.S. Cl.
CPC ............ *G06F 1/3265* (2013.01); *G06F 3/14* (2013.01); *G09G 5/10* (2013.01); *G09G 2320/0626* (2013.01)

(58) Field of Classification Search
CPC ........ G06F 1/3218; G06F 1/3265; G06F 3/14; G06N 20/00; G06N 3/045; G06N 3/08; G09G 2320/0626; G09G 2320/103; G09G 2330/021; G09G 2354/00; G09G 3/20; G09G 5/10; Y02D 10/00
See application file for complete search history.

(56) References Cited

U.S. PATENT DOCUMENTS

| | | | |
|---|---|---|---|
| 2011/0161522 A1* | 6/2011 | Diab ....................... | H04L 49/35 710/13 |
| 2019/0052908 A1* | 2/2019 | Mertens ............... | H04N 19/102 |

* cited by examiner

*Primary Examiner* — Insa Sadio
(74) *Attorney, Agent, or Firm* — Hanley, Flight & Zimmerman, LLC

(57) ABSTRACT

Methods, apparatus, systems, and articles of manufacture to control an aggressiveness of display panel power savings are disclosed. An example apparatus include a display panel, a display controller to adjust an image to be displayed by the display panel, and a power savings controller to access an image provided to the display controller, execute a machine learning model using the image as an input to generate an aggressiveness value, and provide the aggressiveness value to the display controller, the display controller to adjust the image based on the aggressiveness value.

21 Claims, 16 Drawing Sheets

METHODS AND APPARATUS TO CONTROL AN AGGRESSIVENESS OF DISPLAY PANEL POWER SAVINGS AND FIDELITY

FIELD OF THE DISCLOSURE

This disclosure relates generally to display controllers and, more particularly, to methods and apparatus to control an aggressiveness of display panel power and fidelity.

BACKGROUND

Computing systems, such as personal computers, laptops, tablets, mobile devices (e.g., cell phones), include many different components. One such component is a display for displaying information (e.g., images) to a user. Despite significant optimization techniques developed over the last decade, the display remains one of the main power consuming components of such computing systems.

BRIEF DESCRIPTION OF THE DRAWINGS

The figures are not to scale. In general, the same reference numbers will be used throughout the drawing(s) and accompanying written description to refer to the same or like parts.

Figure 1:
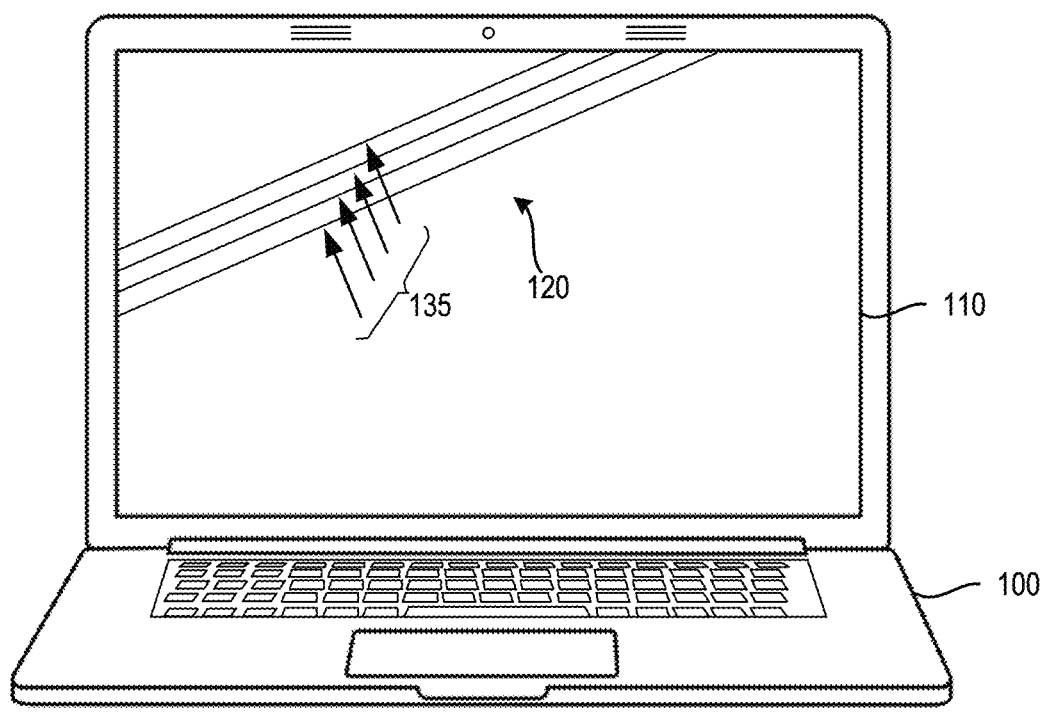
FIG. 1 is a diagram illustrating example artifacts that may be introduced as a result of the use of a power savings algorithm.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Display components are typically the highest power consuming devices within any computing systems such as personal computers, tablets, mobile devices, cell phones, etc. Techniques such as Display Power Saving Technology (DPST) and Content Adaptive Backlight Control (CABC) are used for Liquid Crystal Display (LCD) panels to lower the amount of power consumed by the display. Such approaches rely on enhancing the contrast of the image being displayed and simultaneously lowering the display backlight, such that resulting effect has similar user experience and lower display power. In some examples, up to 50% display backlight power savings can be achieved with DPST for LCD displays. Though DPST and similar algorithm has high power saving potentials, it suffers from several challenges including for example, inconsistent image fidelity, visual artifacts, low power savings in during certain types of mobile device usage scenarios (e.g., while web browsing), etc.

In some examples, display controllers have a finite number of power savings settings (e.g., five levels of power savings). Higher power savings settings result in higher power savings at the cost of lower image fidelity, whereas lower power savings settings result in better fidelity at the cost of consuming more power. For example, in a five level system, level 5 results in the most power savings with highest fidelity drop, while level 1 results in the least power savings with lower fidelity drop. Based on the level selected, the power savings system uses heuristically tuned parameters and frame histograms to apply pixel brightness enhancements and backlight control in real-time, in an effort to reduce (e.g., conserve) power consumed by the display. Unfortunately, the image fidelity using this approach varies drastically depending on the content. For some content, the image may be degraded to an unacceptable level of quality. For example, at Level 5, two images can have a same amount of power savings (e.g., 10% power savings), but can have drastically different image quality (e.g., one of the images may have a noticeable loss in quality and/or may include distortion). In general, for power to be saved, some amount of loss in quality is encountered, and that amount of loss in quality may vary based on the image to be displayed.

Moreover, such power savings algorithms may result in the creation of artifacts, particularly for images with color gradients. Some power savings algorithms attempt to enhance images by altering the values of pixels within the image, so that backlight power can be reduced. In general, such an approach has minimal to no impact on image quality. However, color compression can, in some examples, cause color banding artifacts if the displayed image contains color gradients, like images with blue sky, sun rise, sun set, lake, etc.

FIG. 1 is a diagram illustrating example artifacts that may be introduced as a result of the use of a power savings algorithm. The illustrated example of FIG. 1 shows a computing device 100 that includes a display 110 presenting an image 120. The image 120 of the illustrated example of FIG. 1 includes artifacts 135, which are represented as diagonal lines. In some conditions, these artifacts 135 become more prominent because these color bands can be seen to move on the display (at times for couple seconds) as the pixel enhancements are applied. The rolling of the color bands called a rolling effect, and is a result of the pixel enhancements being applied gradually for a smoother transition (e.g., over a few frames or a few seconds, depending on the updates required). The rolling effect negatively impacts the user experience, to the point that, in some instances, users and/or manufacturers may simply disable all power savings functionality on their computing system.

While the example artifacts 135 of the illustrated example of FIG. 1 are illustrated as parallel diagonal lines across the display 110, any number of artifacts oriented in any direction may be manifested. Moreover, while in the illustrated example of FIG. 1, the artifacts are manifested as lines, such artifacts might alternatively be presented in using any other shape.

In addition to the creation of artifacts, in some examples, power saving algorithms might result in little to no backlight power savings for most browsing and productivity content. For example, the DPST algorithm provides little to no power savings for content with a higher amount of white color, for example web browsing and Outlook scenarios. Usage reports suggest that many computing systems are used primarily for web browsing and/or scenarios, where there is little to no power savings when applying the DPST algorithm.

Moreover, some power savings algorithms lack the capability to dynamically tune and/or adjust the display color gamut in real-time depending on the content, such that the contents that do not benefit from higher color gamut (like 90% DCI-P3) can be displayed at lower color gamut (like 100% sRGB) to save power. As a result, the content that realizes the full range of color gamut (or can benefit from higher color gamut) will be displayed using higher gamut, for best in class user experience. Existing systems utilize a static color gamut and have no ability to change the color gamut in real-time.

Additionally, current power savings algorithms do not offer power saving features for use with Organic Light Emitting Diode (OLED) displays. One example challenge is that OLED is an emissive technology, which does not utilize a backlight. As a result, increasing the contrast to lower the backlight does not work for OLED displays. Instead, OLED requires other techniques where the local contrast of the images is enhanced, such that global brightness can be reduced for power saving. However, the limitation with reducing the global brightness of OLED display, is that it can impact the user experience for certain contents, hence offers inconsistent fidelity.

Examples disclosed herein utilize machine learning to dynamically change the aggressiveness level of the algorithm used for display power saving (like DPST, CABC, etc.) based on the content, to improve the power saving prospects and avoid situations where power savings would result in lowering of fidelity below an acceptable threshold. In examples disclosed herein, the machine learning model is trained to select a power savings (e.g., aggressiveness) level that has a maximum power saving and a user experience above a mean opinion score (MOS) threshold. The MOS represents the average user experience (e.g., a user's opinion) at various power savings levels. In examples disclosed herein, the MOS is represented in a range of 1-5, and the threshold MOS value is 4.5. However, any other ranges and/or thresholds may additionally or alternatively be used. As a result of the machine learning, in the case of DPST, Level 1 may be selected for content with color gradients (e.g., to avoid color banding and rolling effects), and Level 5 may be selected for media playback content with darker scenes to attain maximum power savings. Examples disclosed herein helps to attain maximum power savings with consistent visual quality.

While examples disclosed herein are described in the context of using the DPST power saving algorithm, the proposed machine learning solution can also be extended to other display power saving algorithms and/or techniques to dynamically tune the algorithm based on the content. For example, algorithms that enhance the fidelity by increasing the contrast and brightness (increasing the brightness will increase display power), to dynamically tune the algorithm based on the content such that best fidelity can be utilized. Moreover, algorithms that can change the display color gamut dynamically based on the content, for example use higher color gamut (like 90% DCI-P3) for Adobe Photoshop and lower color gamut (like 100% sRGB) for emails and web browsing can be utilized. Furthermore, algorithms that provide power saving for OLED display by enhancing the local contrast and reducing the global brightness (lowering brightness may impact user experience), to dynamically tune the algorithm based on the content can be utilized. As a result, power savings can be delivered with better local contrast and non-perceivable visual losses.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data to control an aggressiveness value that is provided to a display controller.

Many different types of machine learning models and/or machine learning architectures exist. In examples disclosed herein, a convolutional neural network (CNN) model is used. Using a CNN model enables the use of ultra-low power and low latency hardware. In general, machine learning models/architectures that are suitable to use in the example approaches disclosed herein will be capable of being executed in a low power and low latency environment. However, other types of machine learning models and/or architectures could additionally or alternatively be used such as Deep Neural Networks (DNNs), Long Short-Term Memory (LSTM), Support Vector Machine (SVM), etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, an expected aggressiveness value, etc.)

In examples disclosed herein, ML/AI models are trained using stochastic gradient descent. However, any other training algorithm may additionally or alternatively be used. In examples disclosed herein, training is performed until an acceptable amount of training error is achieved. In examples disclosed herein, training is performed at a model creation and distribution system. Training is performed using hyperparameters that control how the learning is performed (e.g., a learning rate, a number of layers to be used in the machine learning model, etc.). In some examples re-training may be performed. Such re-training may be performed in response to an indication that new training data is available, a user request, development of a new power saving algorithm that is to be controlled, etc.

Training is performed using training data. In examples disclosed herein, the training data originates from user tests. Because supervised training is used, the training data is labeled. Labeling is applied to the training data by selecting a power savings score and a mean opinion score (MOS), representing the quality of the image according to multiple users, that are to be used in connection with an image.

Once training is complete, the model is deployed for use as an executable construct that processes an input and provides an output based on the network of nodes and connections defined in the model. The model is stored at a memory of a power savings controller. The model may then be executed by a power savings controller to select an aggressiveness level that is to be used by a display controller.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 2:
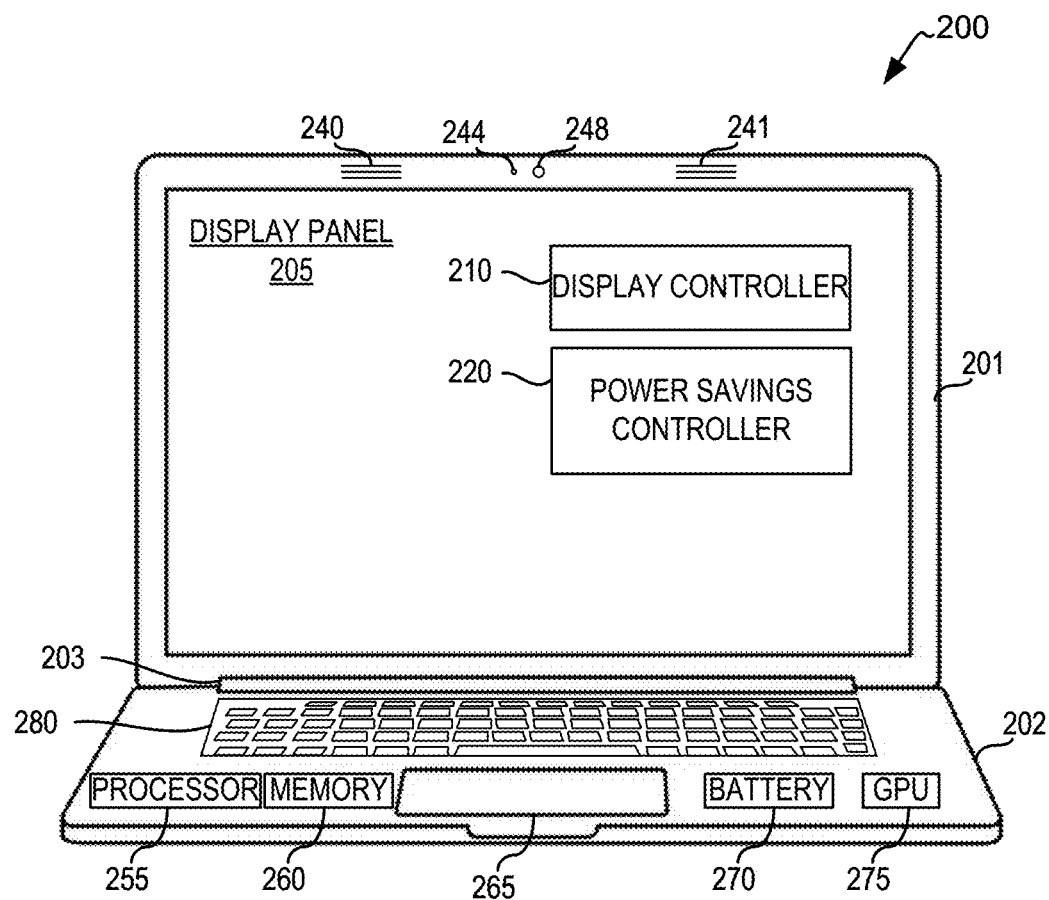
FIG. 2 is a block diagram of an example computing system implemented using a laptop form factor constructed in accordance with the teachings of this disclosure.

FIG. 2 is a block diagram of an example computing system implemented using a laptop form factor constructed in accordance with the teachings of this disclosure. The example laptop 200 of the illustrated example of FIG. 2 includes an upper portion 201 and a lower portion 202 connected via a hinge 203. The upper portion 201 includes a display panel, a display controller 210, a power savings controller 220, speakers 240, 241, a microphone 244 and a camera 248. In some examples, the upper portion 201 is referred to as a lid.

The lower portion 202 includes a processor 255, a memory 260, a trackpad 265, a battery 270, a graphics processing unit (GPU), and a keyboard 280. In the illustrated example of FIG. 2, the GPU 275 provides an image to the display controller 210 for display via the display panel 205. The example power savings controller 220 also receives the image from the GPU 275, and provides an aggressiveness value to the display controller 210 to control power savings operations of the display controller 210. While particular components of the example laptop 200 of FIG. 2 are shown in either the upper portion 201 or the lower portion 202, such components may be implemented in any location within the laptop 200. For example, the power savings controller 220 may be implemented in the lower portion 202.

Figure 3:
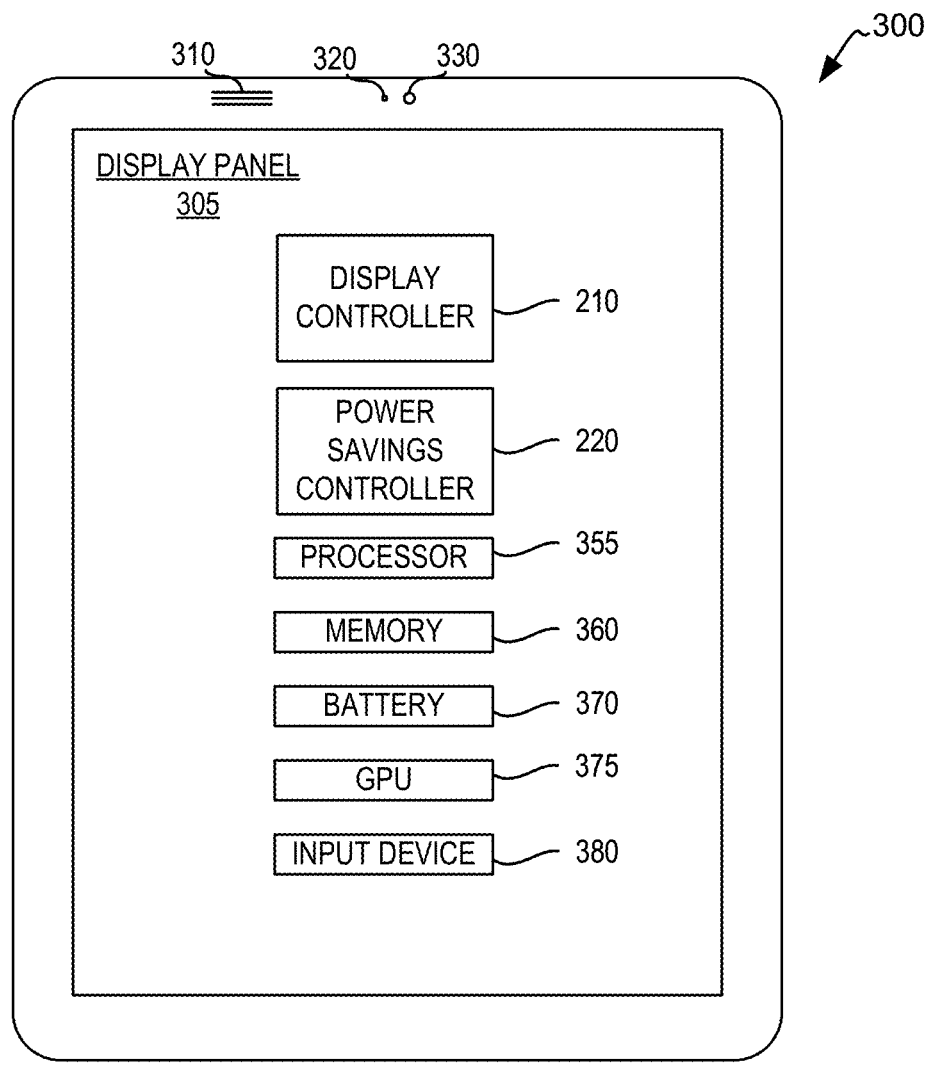
FIG. 3 is a block diagram of an example computing system implemented using a tablet form factor constructed in accordance with the teachings of this disclosure.

FIG. 3 is a block diagram of an example computing system implemented using a tablet form factor constructed in accordance with the teachings of this disclosure. The example tablet 300 of the illustrated example includes the example display controller 210, the example power savings controller 220, a display panel 305, a speaker 310, a microphone 320, a camera 330, a processor 355, a memory 360, a battery 370, a GPU 375, and an input device 380. In some examples, the input device 380 may be implemented as a touchscreen.

While in the illustrated example of FIGS. 2 and/or 3 the GPU is shown as a separate component from the processor, in some examples, the GPU and processor may be implemented together (e.g., as a system-on-a-chip (SOC)). In some examples, the power savings controller 220 and/or the display controller 210 may additionally be implemented together with the processor and/or GPU.

Figure 4:
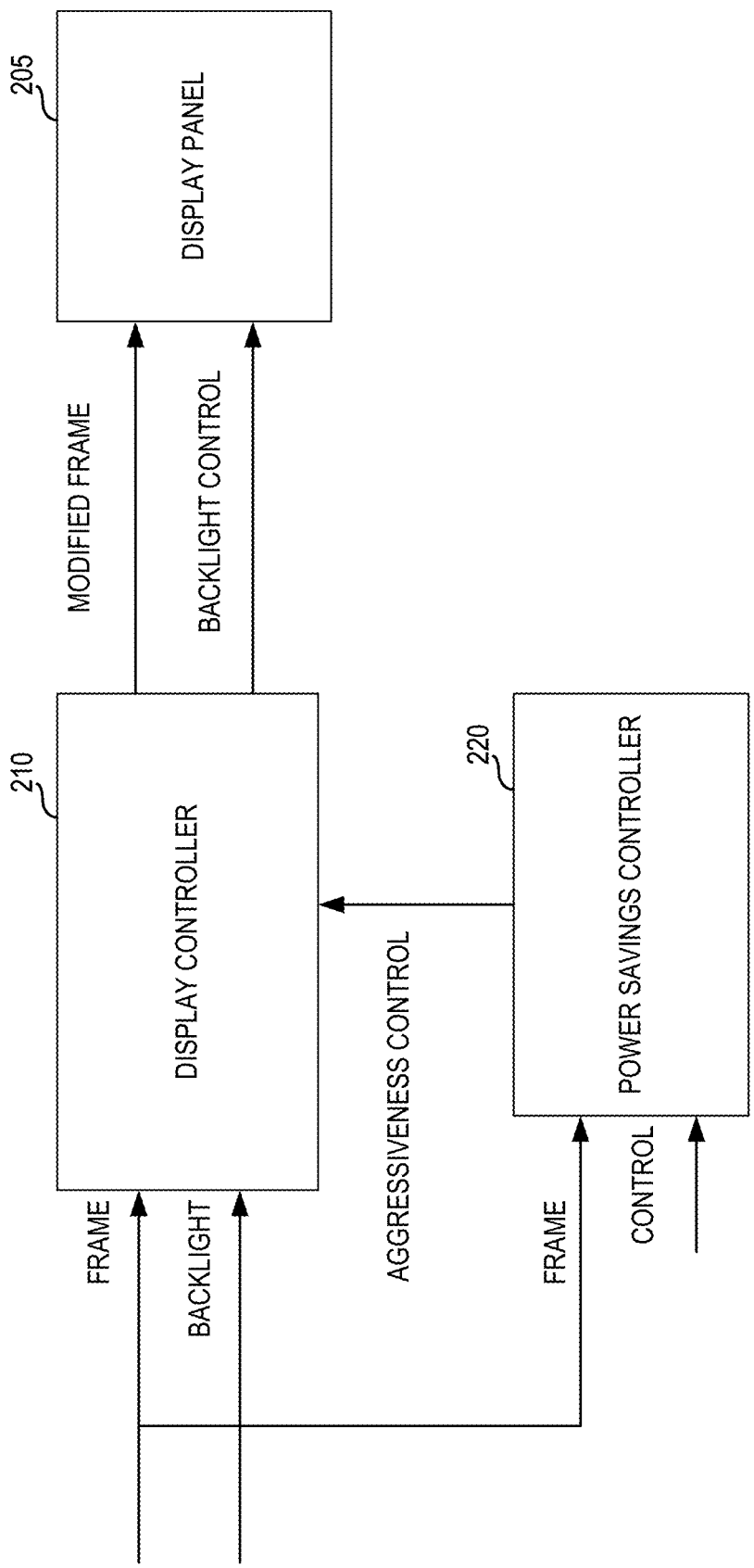
FIG. 4 is a block diagram illustrating connections between the display controller, power savings controller, and display panel of the example computing systems of FIGS. 2 and/or 3.

FIG. 4 is a block diagram illustrating connections between the display controller, power savings controller, and display panel of the example computing systems of FIGS. 2 and/or 3. In the illustrated example of FIG. 4, the example display controller 210 receives a frame (e.g., an image) and a backlight value (e.g., from the GPU). The example display controller 210 also receives an aggressiveness control value from the power savings controller 220. The power savings controller 220 accesses the frame (e.g., the image) and, using a machine learning model, generates the aggressiveness control value that is to be provided to the display controller 210. In the illustrated example of FIG. 4, an aggressiveness control value is provided to the display controller 210 periodically (e.g., in response to expiration of a timer, every frame, every nth frame, etc.). However, in some examples, the aggressiveness control value may be provided a-periodically. Using the aggressiveness control value, the display controller 210 modifies the frame and/or the backlight, and provides the modified frame and backlight value to the display panel 205. The display panel 205 then presents the modified frame.

Figure 5:
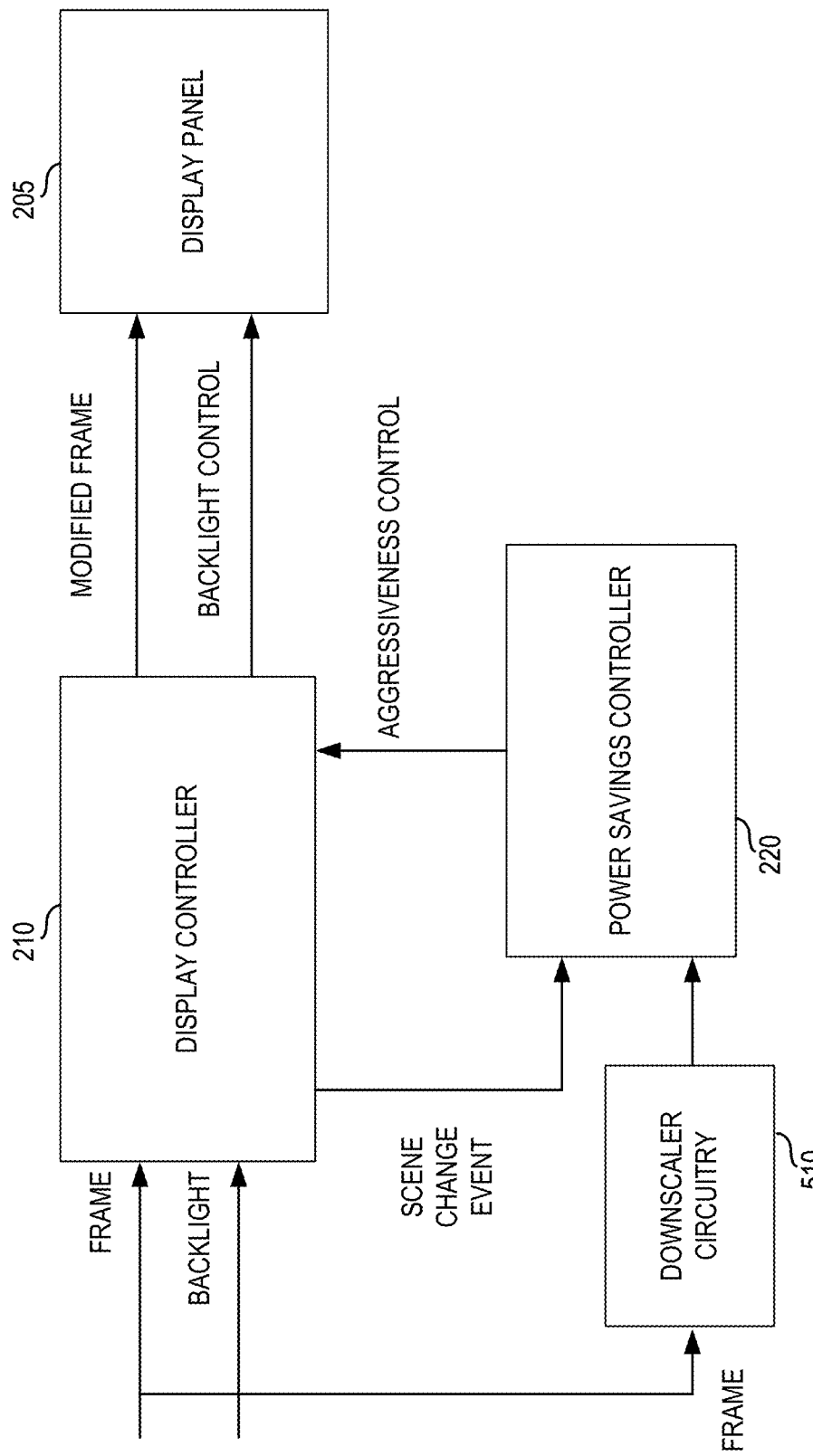
FIG. 5 is a block diagram illustrating alternative connections between the display controller, power savings controller, and display panel of the example computing systems of FIGS. 2 and/or 3.

FIG. 5 is a block diagram illustrating alternative connections between the display controller 210, power savings controller 220, and display panel 205 of the example computing systems of FIGS. 2 and/or 3. In the illustrated example of FIG. 5, downscaler circuitry 510 is used to downscale the frame before generation of the aggressiveness control value by the power savings controller 220. Downscaling the frame (e.g., from a 4K image (e.g., 3840×2160 pixels) to a VGA image (e.g., 640×480 pixels)), reduces the amount of information that is to be processed by the power savings controller 220. In the illustrated example of FIG. 5, the downscaler circuitry 510 is implemented separately from the power savings controller 220. However, in some examples (such as the illustrated example of FIG. 8, described below), downscaler circuitry is implemented as a component of the power savings controller 220.

Moreover, in the illustrated example of FIG. 5, the power savings controller 220 receives a scene change event trigger from the display controller 210. The scene change event triggers the power savings controller 220 to generate a new aggressiveness control value, and provide the newly generated aggressiveness control value to the display controller 210.

Figure 6:
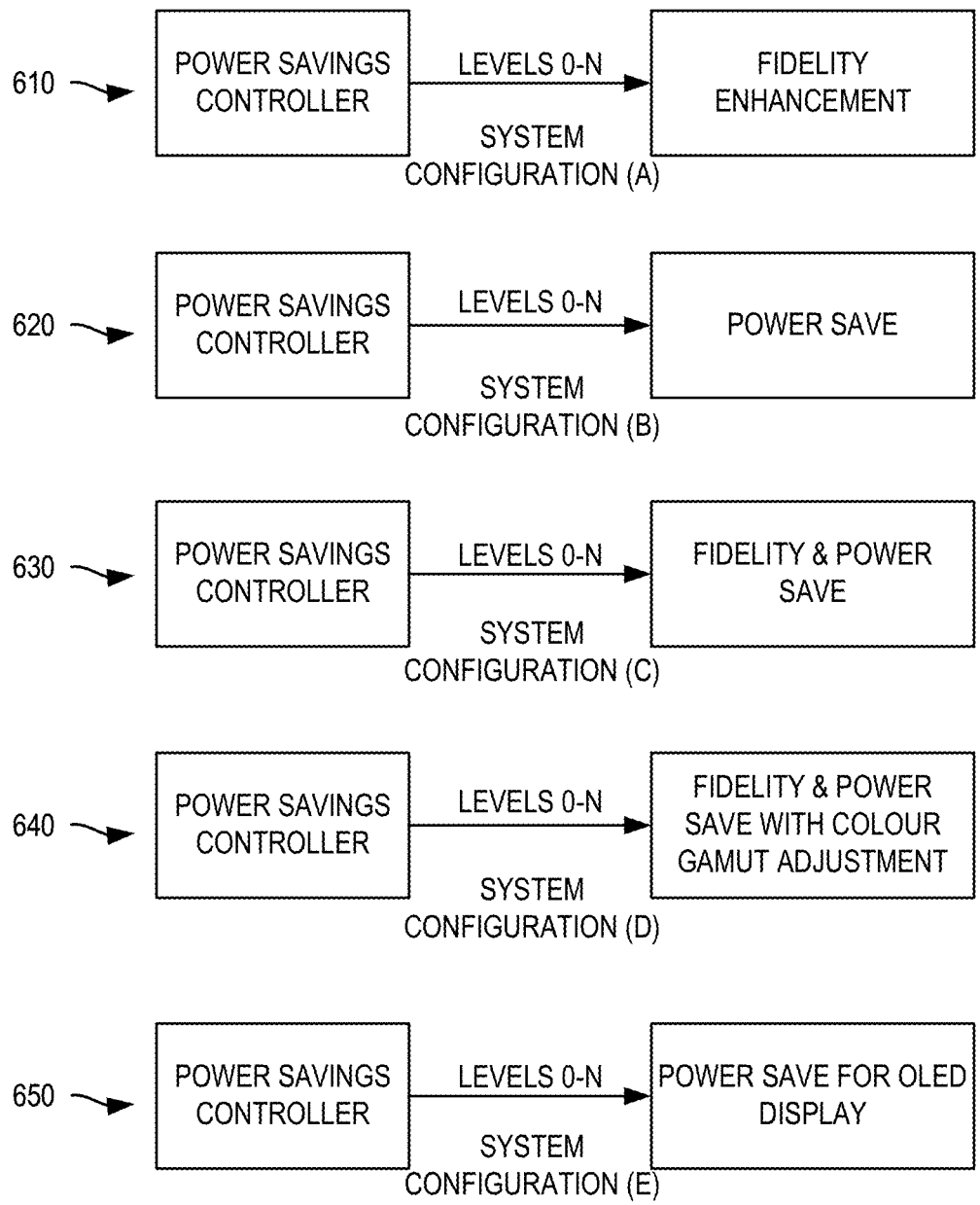
FIG. 6 is a diagram illustrating the power savings controller providing aggressiveness values to various types of power savings algorithms used by a display controller.

FIG. 6 is a diagram illustrating the power savings controller providing aggressiveness values to various types of power savings algorithms used by a display controller. Different types of power savings algorithms exist for use by display controllers including, for example, Display Power Saving Technology (DPST), Localized Adaptive Contrast Enhancement (LACE), Content Adaptive Backlight Control (CABC), Dynamic Display Color Gamut (DDCG), etc. In many such examples, the power savings algorithms utilize one or more inputs to control an amount of correction and/or modification that is performed in an attempt to reduce power consumption of the display panel. In some examples, a display controller may execute one or more different types of power savings algorithms.

In the illustrated example of FIG. 6, a first example 610 represents a power savings controller providing an aggressiveness value to control an amount of fidelity enhancement to be applied by the display controller. A second example 620 represents a power savings controller providing an aggressiveness value to control an amount of power saving to be applied by the display controller. A third example 630 represents a power savings controller providing an aggressiveness value to control an amount of fidelity and power savings to be applied by the display controller. A fourth example 640 represents a power savings controller providing an aggressiveness value to control an amount of fidelity enhancement, power savings, and color gamut adjustment to be applied by the display controller. A fifth example 650 represents a power savings controller providing an aggressiveness value to control an amount of power savings to be applied by the display controller when controlling an OLED display. In some examples, the power savings controller outputs multiple different aggressiveness values to be used by the display controller.

Figure 7:
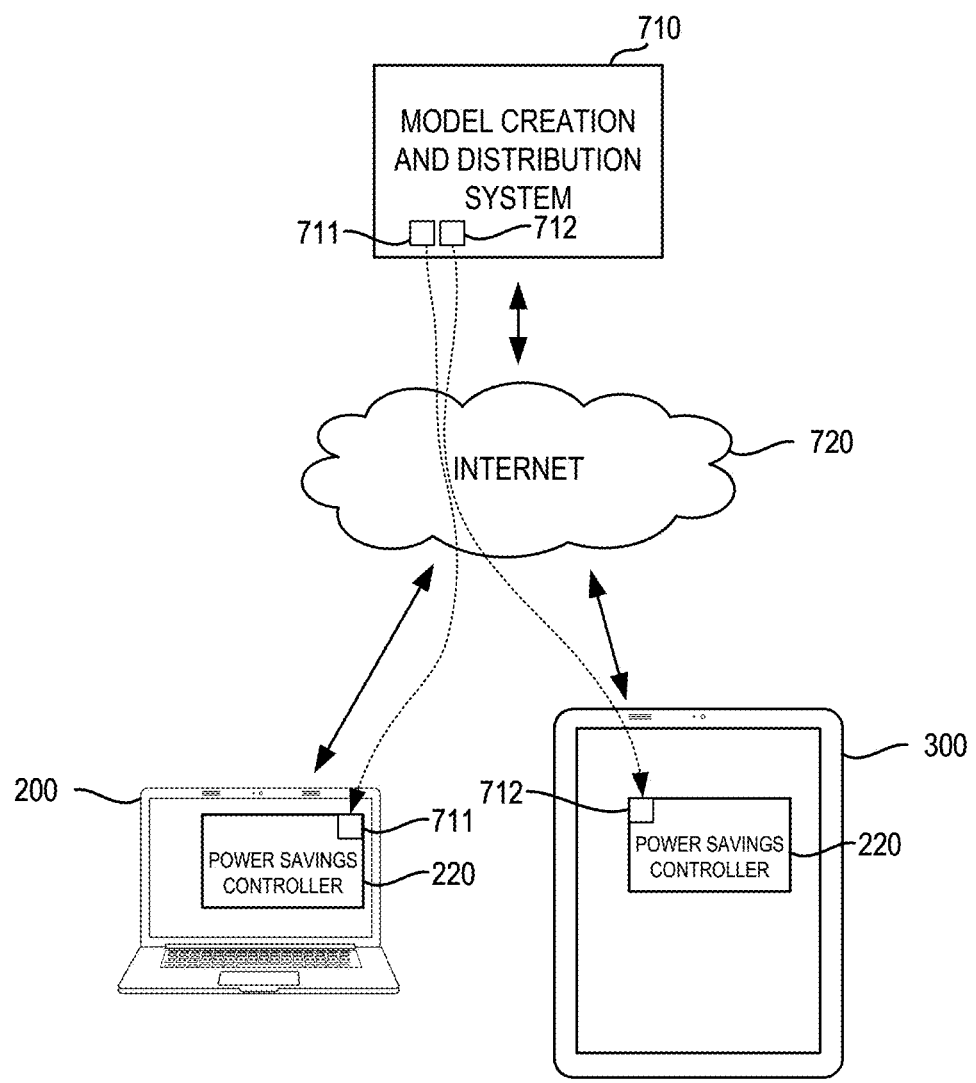
FIG. 7 is a system diagram illustrating the distribution of a model from a model creation and distribution system to a power savings controller.

FIG. 7 is a block diagram illustrating the distribution of a model from a model creation and distribution system to a power savings controller. The illustrated example of FIG. 7 includes a model creation and distribution system 710 that distributes models 711, 712 to power savings controllers of respective computing devices 200, 300. In the illustrated example of FIG. 7, such distribution is performed via the internet 720.

In the illustrated example of FIG. 7, different models are supplied to each of the different computing devices 200, 300. For example, a first model 711 is provided to a first computing device 200 (e.g., a laptop), while a second model 712 is provided to a second computing device 300 (e.g., a tablet). While in the illustrated example of FIG. 7, two models are shown, in some examples, the same model may be provided to different computing devices. Moreover, in some examples, different models may be distributed to different computing systems not only based on the form factor, but additionally or alternatively based on other features of the computing device including, for example, a make and/or model of the computing device, a type of display panel included in the computing device, a type of display controller included in the computing device, power savings algorithms supported by the display controller of the computing device, etc.

In the illustrated example of FIG. 7, the model(s) are distributed via the internet 720. However, the models may be distributed to the computing devices 200, 300 in any other fashion. For example, the model(s) may be provided to the computing devices via a local area network (LAN), via a virtual private network (VPN), via a physical connection, etc. In some examples, the model(s) are provided to the computing devices 200, 300 at a time of manufacture of the computing devices 200, 300. However, the model(s) may be provided to the computing device 200, 300 at any other time including, for example, after a time of sale of the computing device 200, 300. This enables, for example, updates to be made to computing devices to improve the quality of the display and/or power savings associated therewith.

Figure 8:
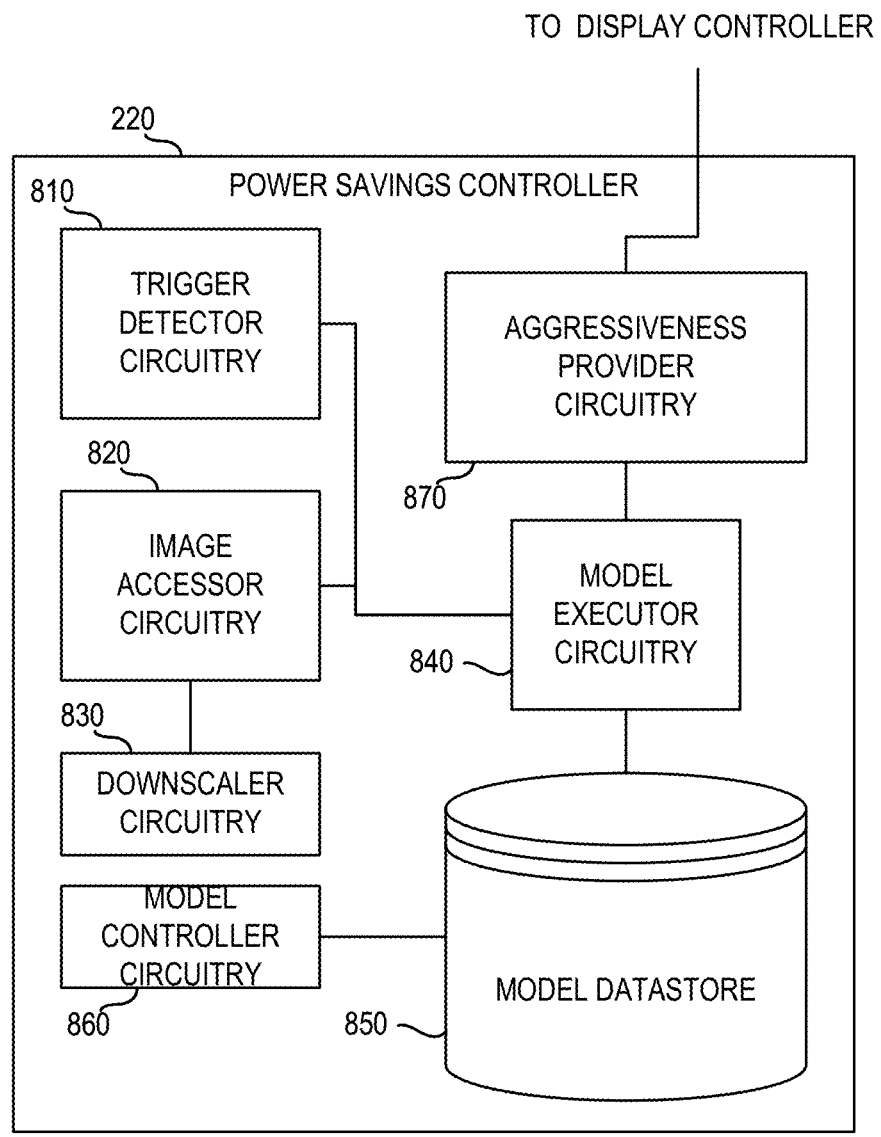
FIG. 8 is a block diagram of an example implementation of the power savings controller of FIGS. 2 and/or 3.

FIG. 8 is a block diagram of an example implementation of the power savings controller 220 of FIGS. 2 and/or 3. The example power savings controller 220 of the illustrated example of FIG. 8 includes trigger detector circuitry 810, image accessor circuitry 820, downscaler circuitry 830, model executor circuitry 840, a model datastore 850, model controller circuitry 860, and aggressiveness provider circuitry 870.

The example trigger detector circuitry 810 of the illustrated example of FIG. 8 trigger detector circuitry 810 determines whether an aggressiveness value is to be generated. The example triggered detector circuitry 810 may make such a determination based on, for example, an event (e.g., a scene change event being provided by the display controller 210 to the power savings controller 220). Alternatively, the trigger detector circuitry 810 may analyze images accessed by the image accessor circuitry 820 to determine whether a scene change has occurred.

In some examples, the trigger detector circuitry 810 determines that an aggressiveness value is to be generated on a periodic basis. For example, the example trigger detector circuitry 810 may determine that an aggressiveness value is to be generated every frame, every three frames, every second, every ten seconds, every minute, etc. Having the trigger detector circuitry 810 use a short periodicity (e.g., triggering to generate an aggressiveness value every frame) may result in additional power being consumed by the power savings controller, although this additional power consumed is likely outweighed by the savings that can be achieved as a result of the use of the aggressiveness value.

The example image accessor circuitry 820 of the illustrated example of FIG. 8 accesses an image provided to the display controller 210. In some examples, the image is accessed by monitoring a data line from a GPU to the display controller 210. In some examples, the image is accessed by reading a memory of the display controller 210.

The example downscaler circuitry 830 of the illustrated example of FIG. 8 performs downscaling of the accessed image. In examples disclosed herein, the downscaling of the accessed image converts the accessed image from a first resolution to a second resolution having fewer pixels than the first resolution. In some examples, bicubic image downscaling is used. However, any other downscaling algorithm may additionally or alternatively be used. In some examples, the downscaler circuitry 830 may be implemented separately from the power savings controller 220. In such an example, the example image accessor circuitry 820 may instead access the downscaled image from the downscaler circuitry. Additionally or alternatively, downscaling of the image may be omitted entirely.

The example model executer circuitry 840 of the illustrated example of FIG. 8 uses a model stored in the model datastore 850 and the downscaled image provided by the downscaler circuitry 830 to generate an aggressiveness value. In some examples, a single aggressiveness value is generated. However, in some other examples, multiple aggressiveness values are generated to be provided to the display controller 210. Such multiple aggressiveness values may correspond to, for example, different types of power savings algorithms that may be implemented by the display controller 210.

The example model data store 850 of the illustrated example of FIG. 8 is implemented by any memory, storage device and/or storage disc for storing data such as, for example, flash memory, magnetic media, optical media, solid state memory, hard drive(s), thumb drive(s), etc. Furthermore, the data stored in the example model data store 850 may be in any data format such as, for example, binary data, comma delimited data, tab delimited data, structured query language (SQL) structures, etc. While, in the illustrated example, the model data store 850 is illustrated as a single device, the example model data store 850 and/or any other data storage devices described herein may be implemented by any number and/or type(s) of memories. In the illustrated example of FIG. 8, the example model data store 850 stores machine learning models obtained by the model controller circuitry 860 for use by the model executor circuitry 840.

The example model controller circuitry 860 of the illustrated example of FIG. 8 obtains the model from the model creation and distribution system 710. In some examples, the model controller circuitry 860 periodically communicates with the model creation and distribution system 710 to, for example, determine whether any updated model(s) are available. If so, the model controller circuitry 860 may download the updated model (e.g., with or without user involvement). As a result, the updated model may then be used by the example model executor circuitry 840 to generate subsequent aggressiveness value(s).

The example aggressiveness provider circuitry 870 of the illustrated example of FIG. 8 provides the generated aggressiveness value(s) to the display controller 210. In examples disclosed herein, the aggressiveness value(s) are provided as one or more digital values. However, in some examples, analog aggressiveness value(s) may instead be provided to the display controller 210.

In some examples, the power savings controller 220 includes means for accessing. For example, the means for accessing may be implemented by the example image accessor circuitry 820. In some examples, the example image accessor circuitry 820 may be implemented by machine executable instructions such as that implemented by at least block 1220 of FIG. 12 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the example image accessor circuitry 820 is implemented by other hardware logic circuitry, hardware implemented state machines, and/or any other combination of hardware, software, and/or firmware. For example, the example image accessor circuitry 820 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the power savings controller 220 includes means for executing. For example, the means for executing may be implemented by the example model executor circuitry 840. In some examples, the example model executor circuitry 840 may be implemented by machine executable instructions such as that implemented by at least block 1240 of FIG. 12 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the example model executor circuitry 840 is implemented by other hardware logic circuitry, hardware implemented state machines, and/or any other combination of hardware, software, and/or firmware. For example, the example model executor circuitry 840 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the power savings controller 220 includes means for providing. For example, the means for providing may be implemented by the example aggressiveness provider circuitry 870. In some examples, the example aggressiveness provider circuitry 870 may be implemented by machine executable instructions such as that implemented by at least block 1250 of FIG. 12 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the example aggressiveness provider circuitry 870 is implemented by other hardware logic circuitry, hardware implemented state machines, and/or any other combination of hardware, software, and/or firmware. For example, the example aggressiveness provider circuitry 870 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the power savings controller 220 includes means for triggering. For example, the means for triggering may be implemented by the example trigger detector circuitry 810. In some examples, the example trigger detector circuitry 810 may be implemented by machine executable instructions such as that implemented by at least block 1210 of FIG. 12 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the example trigger detector circuitry 810 is implemented by other hardware logic circuitry, hardware implemented state machines, and/or any other combination of hardware, software, and/or firmware. For example, the example trigger detector circuitry 810 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the power savings controller 220 includes means for downscaling. For example, the means for downscaling may be implemented by the example downscaler circuitry 830. In some examples, the example downscaler circuitry 830 may be implemented by machine executable instructions such as that implemented by at least block 1230 of FIG. 12 executed by processor circuitry, which may be implemented by the example processor circuitry 1312 of FIG. 13, the example processor circuitry 1500 of FIG. 15, and/or the example Field Programmable Gate Array (FPGA) circuitry 1600 of FIG. 16. In other examples, the example downscaler circuitry 830 is implemented by other hardware logic circuitry, hardware implemented state machines, and/or any other combination of hardware, software, and/or firmware. For example, the example downscaler circuitry 830 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 9:
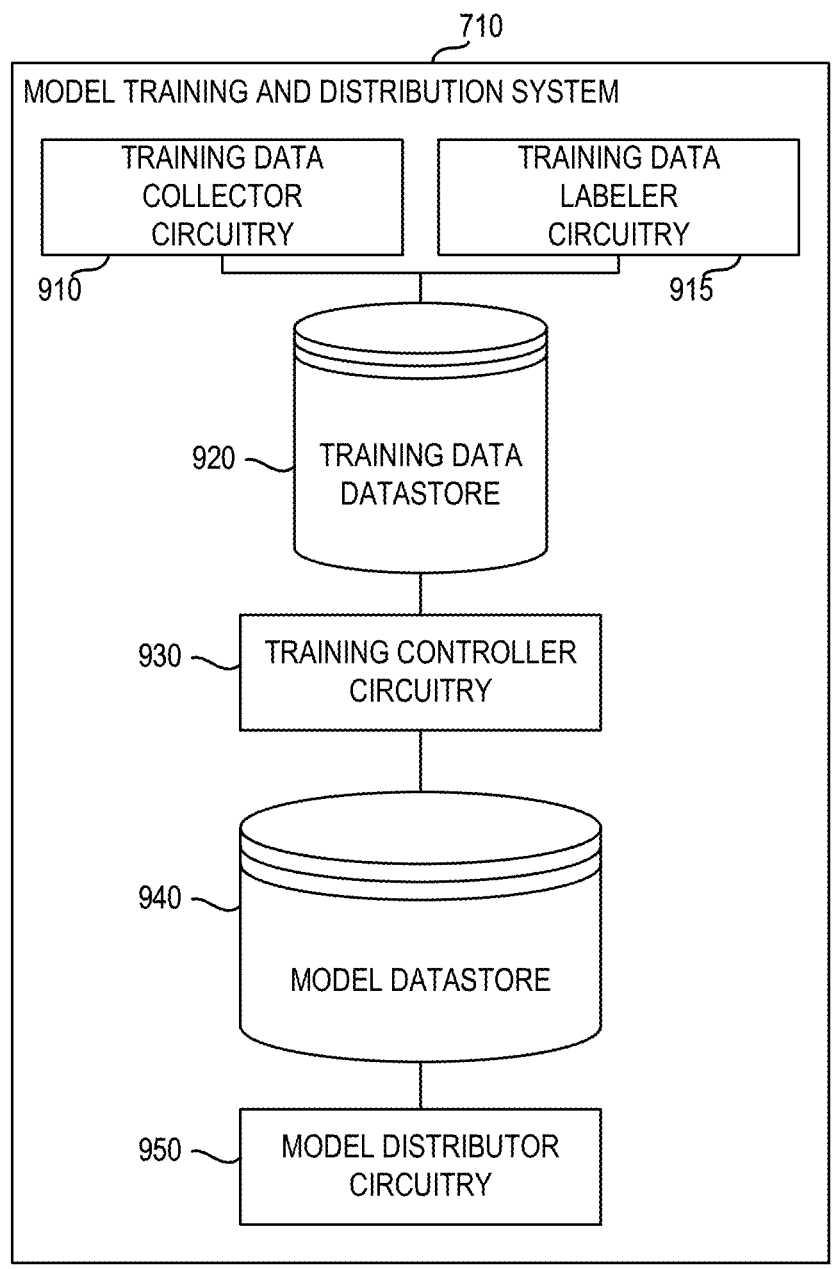
FIG. 9 is a block diagram of an example implementation of the example model creation and distribution system of FIG. 7.

FIG. 9 is a block diagram of an example implementation of the example model creation and distribution system of FIG. 7. The example model creation and distribution system 710 of the illustrated example of FIG. 9 includes training data collector circuitry 910, training data labeler circuitry 915, a training data datastore 920, training controller circuitry 930, a model datastore 940, and model distributor circuitry 950.

The example training data collector circuitry 910 of the illustrated example of FIG. 9 collects training data for use in the training of the machine learning model. In examples disclosed herein, the training data is collected by presenting an image to a user with a particular aggressiveness value being used, and obtaining a score from the user. An amount of power savings as a result of the aggressiveness value used is also recorded. In examples disclosed herein, the score obtained from the user is a rating representing the quality of the displayed image. Many different images are sampled across many different users, each image being sampled with a plurality of different aggressiveness value settings. In some examples, the different images represent different usage scenarios of a typical computing device including, for example, office productivity applications, web browsing, gaming, etc. In examples disclosed herein, the obtained training data is stored in the training data datastore 930.

The example training data labeler circuitry 915 of the illustrated example of FIG. 9 analyzes the collected training data to identify training image and aggressiveness pairs that result in the greatest power savings, while maintaining at least a threshold level of quality. Using the viewer's scores and power savings values obtained by the training data collector circuitry 910, the example training data labeler circuitry 915 computes a mean score for each frame (an average of user opinion scores for each image and aggressiveness value pair), which is represented as a mean opinion score (MOS). For each image, the example training data labeler circuitry 915 selects aggressiveness value such that the MOS is above a predetermined threshold (e.g., 4.5), and which results in a greatest amount of display power savings. In examples disclosed herein, the threshold quality level is a MOS of 4.5 (out of 5). However, any other threshold quality level may additionally or alternatively be used. If none of the modified frames meet the MOS threshold, then an aggressiveness value of 0 is selected, meaning that the power savings should be disabled for that particular input frame. The selected training data is labeled as having been selected for use in the training process.

The example training data datastore 920 of the illustrated example of FIG. 9 is implemented by any memory, storage device and/or storage disc for storing data such as, for example, flash memory, magnetic media, optical media, solid state memory, hard drive(s), thumb drive(s), etc. Furthermore, the data stored in the example training data datastore 920 may be in any data format such as, for example, binary data, comma delimited data, tab delimited data, structured query language (SQL) structures, etc. While, in the illustrated example, the training data datastore 920 is illustrated as a single device, the example training data datastore 920 and/or any other data storage devices described herein may be implemented by any number and/or type(s) of memories. In the illustrated example of FIG. 9, the example training data datastore 920 stores training data obtained by the training data collector circuitry 910 and/or labeled (e.g., selected) by the training data labeler circuitry 915.

The example training controller circuitry 930 of the illustrated example of FIG. 9 trains a machine learning model based on the selected training image and aggressiveness pairs stored in the training data datastore 920. In this manner, the selected images are used as the input to the machine learning model, and their corresponding aggressiveness values are used as the desired output(s) of the machine learning model. To that end, the trained machine learning model is designed to, based on a given input image, select an aggressiveness value that results in a greatest amount of power savings while also retaining a threshold amount of image fidelity (e.g., quality). In examples disclosed herein, the machine learning model is implemented using a convolutional neural network (CNN), and is trained using stochastic gradient descent. However, any other machine learning model architecture and/or training algorithm may additionally or alternatively be used. The trained model is then stored in the model datastore 940.

The example model datastore 940 of the illustrated example of FIG. 9 is implemented by any memory, storage device and/or storage disc for storing data such as, for example, flash memory, magnetic media, optical media, solid state memory, hard drive(s), thumb drive(s), etc. Furthermore, the data stored in the example model datastore 940 may be in any data format such as, for example, binary data, comma delimited data, tab delimited data, structured query language (SQL) structures, etc. While, in the illustrated example, the model datastore 940 is illustrated as a single device, the example model datastore 940 and/or any other data storage devices described herein may be implemented by any number and/or type(s) of memories. In the illustrated example of FIG. 9, the example model datastore 940 stores models trained by the example training controller circuitry 930. In some examples, multiple models may be stored corresponding to different makes and/or models of computing devices, different types of display controllers, different types of display panels, different power savings algorithms used, etc. The example models stored in the example model datastore 940 are distributed to computing devices by the model distributor circuitry 950.

The example model distributor circuitry 950 of the illustrated example of FIG. 9 distributes the trained machine learning model to the computing device 200, 300 for use by the power savings controller 220. In some examples, the model distributor 950 distributes the trained model in response to a request from the power savings controller 220 of the computing device. In this manner, the power savings controller 220 of each computing device can periodically and/or a-periodically check-in with the model distributor circuitry 950 to determine whether an updated model is to be retrieved. Additionally or alternatively, the model distributor circuitry 950 may push the model out to the power savings controller 220.

In some examples, the model training and distribution system 710 includes means for collecting. For example, the means for collecting may be implemented by the example training data collector circuitry 910. In some examples, the example training data collector circuitry 910 may be implemented by machine executable instructions such as that implemented by at least block 1010 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the example training data collector circuitry 910 is implemented by other hardware logic circuitry, hardware implemented state machines, and/or any other combination of hardware, software, and/or firmware. For example, the example training data collector circuitry 910 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the model training and distribution system 710 includes means for identifying. In some examples, the means for identifying may additionally or alternatively be referred to as means for labeling. For example, the means for identifying may be implemented by the example training data labeler circuitry 915. In some examples, the example training data labeler circuitry 915 may be implemented by machine executable instructions such as that implemented by at least block 1020 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the example training data labeler circuitry 915 is implemented by other hardware logic circuitry, hardware implemented state machines, and/or any other combination of hardware, software, and/or firmware. For example, the example training data labeler circuitry 915 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the model training and distribution system 710 includes means for training. For example, the means for training may be implemented by the example training controller circuitry 930. In some examples, the example training controller circuitry 930 may be implemented by machine executable instructions such as that implemented by at least block 1030 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the example training controller circuitry 930 is implemented by other hardware logic circuitry, hardware implemented state machines, and/or any other combination of hardware, software, and/or firmware. For example, the example training controller circuitry 930 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the model training and distribution system 710 includes means for distributing. For example, the means for distributing may be implemented by the example model distributor circuitry 950. In some examples, the example model distributor circuitry 950 may be implemented by machine executable instructions such as that implemented by at least blocks 1040 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the example model distributor circuitry 950 is implemented by other hardware logic circuitry, hardware implemented state machines, and/or any other combination of hardware, software, and/or firmware. For example, the example model distributor circuitry 950 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the example power savings controller 220 of FIG. 2 is illustrated in FIG. 8, one or more of the elements, processes, and/or devices illustrated in FIG. 8 may be combined, divided, re-arranged, omitted, eliminated, and/or implemented in any other way. Further, the example trigger detector circuitry 810, the example image accessor circuitry 820, the example downscaler circuitry 830, the example model executor circuitry 840, the example model controller circuitry 860, the example aggressiveness provider circuitry 870, and/or, more generally, the example power savings controller 220 of FIG. 8, may be implemented by hardware, software, firmware, and/or any combination of hardware, software, and/or firmware. Thus, for example, any of the example trigger detector circuitry 810, the example image accessor circuitry 820, the example downscaler circuitry 830, the example model executor circuitry 840, the example model controller circuitry 860, the example aggressiveness provider circuitry 870, and/or, more generally, the example power savings controller 220 of FIG. 8, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example trigger detector circuitry 810, the example image accessor circuitry 820, the example downscaler circuitry 830, the example model executor circuitry 840, the example model controller circuitry 860, the example aggressiveness provider circuitry 870 is/are hereby expressly defined to include a non-transitory computer readable storage device or storage disk such as a memory, a digital versatile disk (DVD), a compact disk (CD), a Blu-ray disk, etc., including the software and/or firmware. Further still, the example power savings controller 220 of FIG. 8 may include one or more elements, processes, and/or devices in addition to, or instead of, those illustrated in FIG. 8, and/or may include more than one of any or all of the illustrated elements, processes and devices.

Moreover, while an example manner of implementing the example model training and distribution system 710 of FIG. 7 is illustrated in FIG. 9, one or more of the elements, processes, and/or devices illustrated in FIG. 9 may be combined, divided, re-arranged, omitted, eliminated, and/or implemented in any other way. Further, the example training data collector circuitry 910, the example training data labeler circuitry 915, the example training controller circuitry 930, the example model distributor circuitry 950, and/or, more generally, the example model training and distribution system 710 of FIG. 7, may be implemented by hardware, software, firmware, and/or any combination of hardware, software, and/or firmware. Thus, for example, any of the example training data collector circuitry 910, the example training data labeler circuitry 915, the example training controller circuitry 930, the example model distributor circuitry 950, and/or, more generally, the example model training and distribution system 710 of FIG. 7, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example training data collector circuitry 910, the example training data labeler circuitry 915, the example training controller circuitry 930, the example model distributor circuitry 950 is/are hereby expressly defined to include a non-transitory computer readable storage device or storage disk such as a memory, a digital versatile disk (DVD), a compact disk (CD), a Blu-ray disk, etc., including the software and/or firmware. Further still, the example model training and distribution system 710 of FIG. 7 may include one or more elements, processes, and/or devices in addition to, or instead of, those illustrated in FIG. 9, and/or may include more than one of any or all of the illustrated elements, processes and devices.

Figure 10:
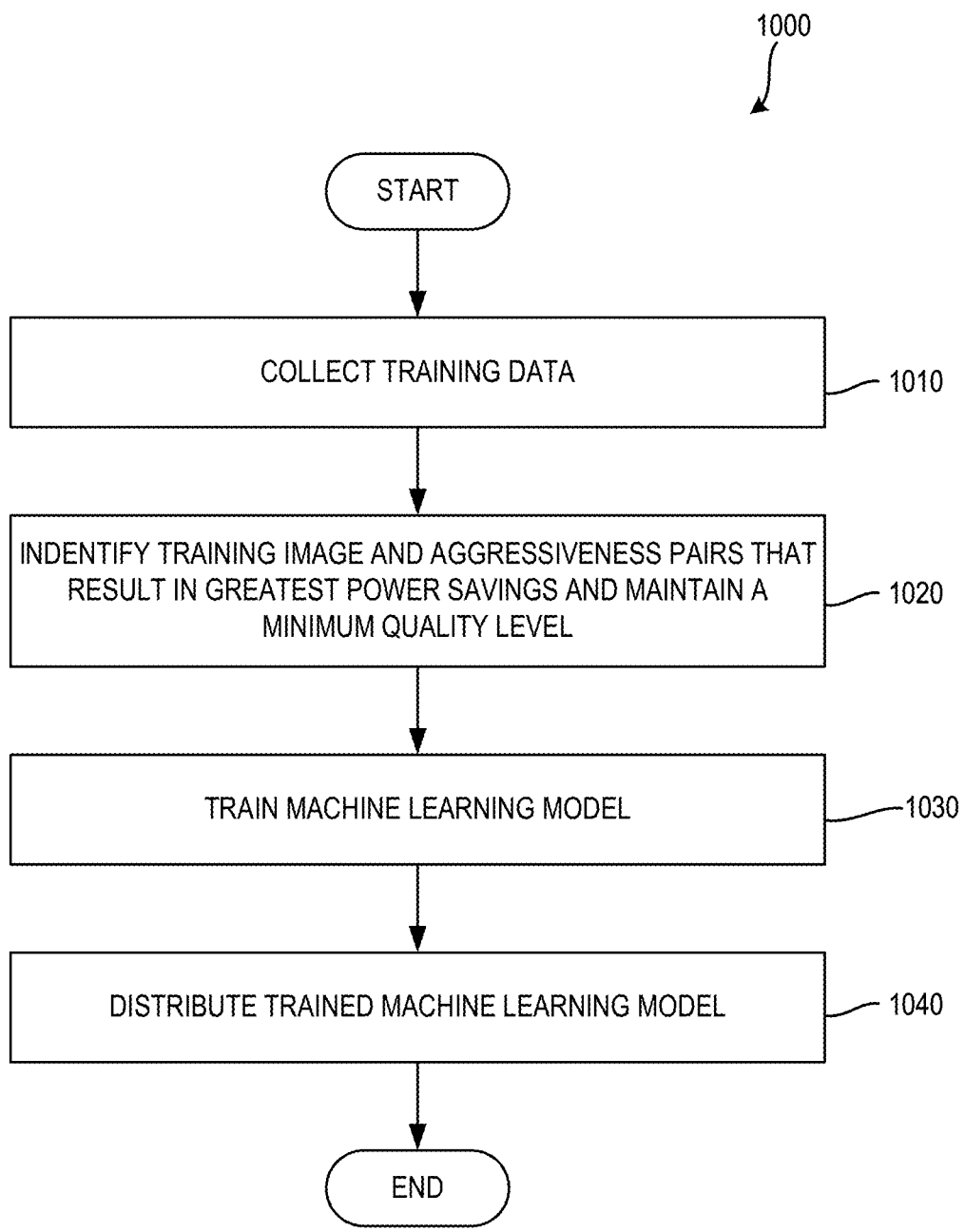
FIG. 10 is a flowchart representative of example machine-readable instructions that may be executed by the example model creation and distribution system to create and distribute a machine learning model.
Figure 12:
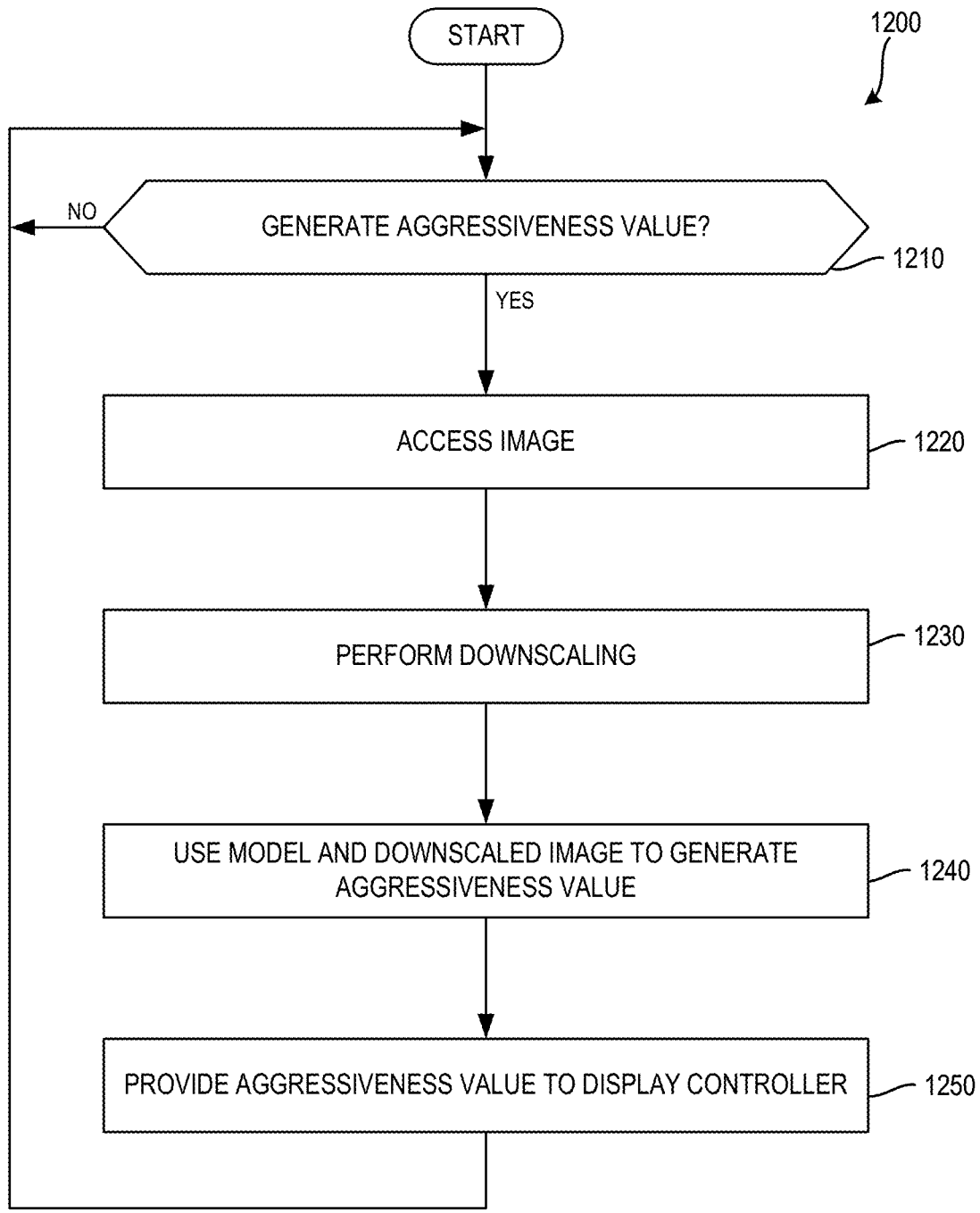
FIG. 12 is a flowchart representative of example machine-readable instructions that may be executed by the power savings controller to generate an aggressiveness value for use by a display controller.

A flowchart representative of example hardware logic circuitry, machine readable instructions, hardware implemented state machines, and/or any combination thereof for implementing the power savings controller 220 of FIG. 8 is shown in FIG. 12. A flowchart representative of example hardware logic circuitry, machine readable instructions, hardware implemented state machines, and/or any combination thereof for implementing the model training and distribution system 710 of FIG. 9 is shown in FIG. 10. The machine readable instructions may be one or more executable programs or portion(s) of an executable program for execution by processor circuitry, such as the processor circuitry 1312, 1412 shown in the example processor platform 1300, 1400 discussed below in connection with FIGS. 13 and/or 14 and/or the example processor circuitry discussed below in connection with FIGS. 15 and/or 16. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIGS. 10 and/or 12, many other methods of implementing the example power savings controller 220 and/or the example model training and distribution system 710 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 10 and/or 12 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 10 is a flowchart representative of example machine-readable instructions that may be executed to create and distribute a machine learning model. The example process 1000 of the illustrated example of FIG. 10 begins when the example training data collector circuitry 910 collects training data. (Block 1010). In examples disclosed herein, the training data is collected by presenting an image to a user with a particular aggressiveness value being used, and obtaining a score from the user and an amount of power savings as a result of the aggressiveness value used. In examples disclosed herein, the score is a rating representing the quality of the displayed image. Many different images are sampled across many different users, each image being sampled with a plurality of different aggressiveness value settings. In some examples, the different images represent different usage scenarios of a typical computing device including, for example, office productivity applications, web browsing, gaming, etc. In examples disclosed herein, the obtained training data is stored in the training data datastore 930. An example data collection process is described in further detail in connection with FIG. 11, below.

The example training data labeler circuitry 915 analyzes the collected training data to identify training image and aggressiveness pairs that result in the greatest power savings, while maintaining at least a threshold level of quality. (Block 1020). Using the viewer's scores and power savings values obtained by the training data collector circuitry 910, the example training data labeler circuitry 915 computes a mean score for each frame (an average of user opinion scores for each image and aggressiveness value pair), which is represented as a mean opinion score (MOS). For each image, the example training data labeler circuitry 915 selects aggressiveness value such that the MOS is above a predetermined threshold (e.g., 4.5), and which results in a greatest amount of display power savings. In examples disclosed herein, the threshold quality level is a MOS of 4.5 (out of 5). However, any other threshold quality level may additionally or alternatively be used. If none of the modified frames meet the MOS threshold, then an aggressiveness value of 0 is selected, meaning that the power savings should be disabled for that particular input frame. The selected training data is labeled as having been selected for use in the training process.

The example training controller circuitry 930 trains a machine learning model based on the selected training image and aggressiveness pairs. (Block 1030). In this manner, the image is used as the input to the machine learning model, and the aggressiveness is used as the desired output of the machine learning model. To that end, the trained machine learning model is designed to, based on a given input image, select an aggressiveness value that results in a greatest amount of power savings while also retaining a threshold amount of image fidelity (e.g., quality). In examples disclosed herein, the machine learning model is implemented using a convolutional neural network (CNN), and is trained using stochastic gradient descent. However, any other machine learning model architecture and/or training algorithm may additionally or alternatively be used. The trained model is then stored in the model datastore 940.

The example model distributor circuitry 950 then distributes the trained machine learning model to the computing device 200, 300 for use by the power savings controller 220. (Block 1040). In some examples, the model distributor 950 distributes the trained model in response to a request from the power savings controller 220 of the computing device. In this manner, the power savings controller 220 of each computing device can periodically and/or a-periodically check-in with the model distributor circuitry 950 to determine whether an updated model is to be retrieved. Additionally or alternatively, the model distributor circuitry 950 may push the model out to the power savings controller 220.

The example process 1000 of FIG. 10 then terminates, but may be repeated to, for example, train another model. A new model may be designed for use with a particular type of display and/or particular type of power saving algorithm being used by a display controller.

Figure 11:
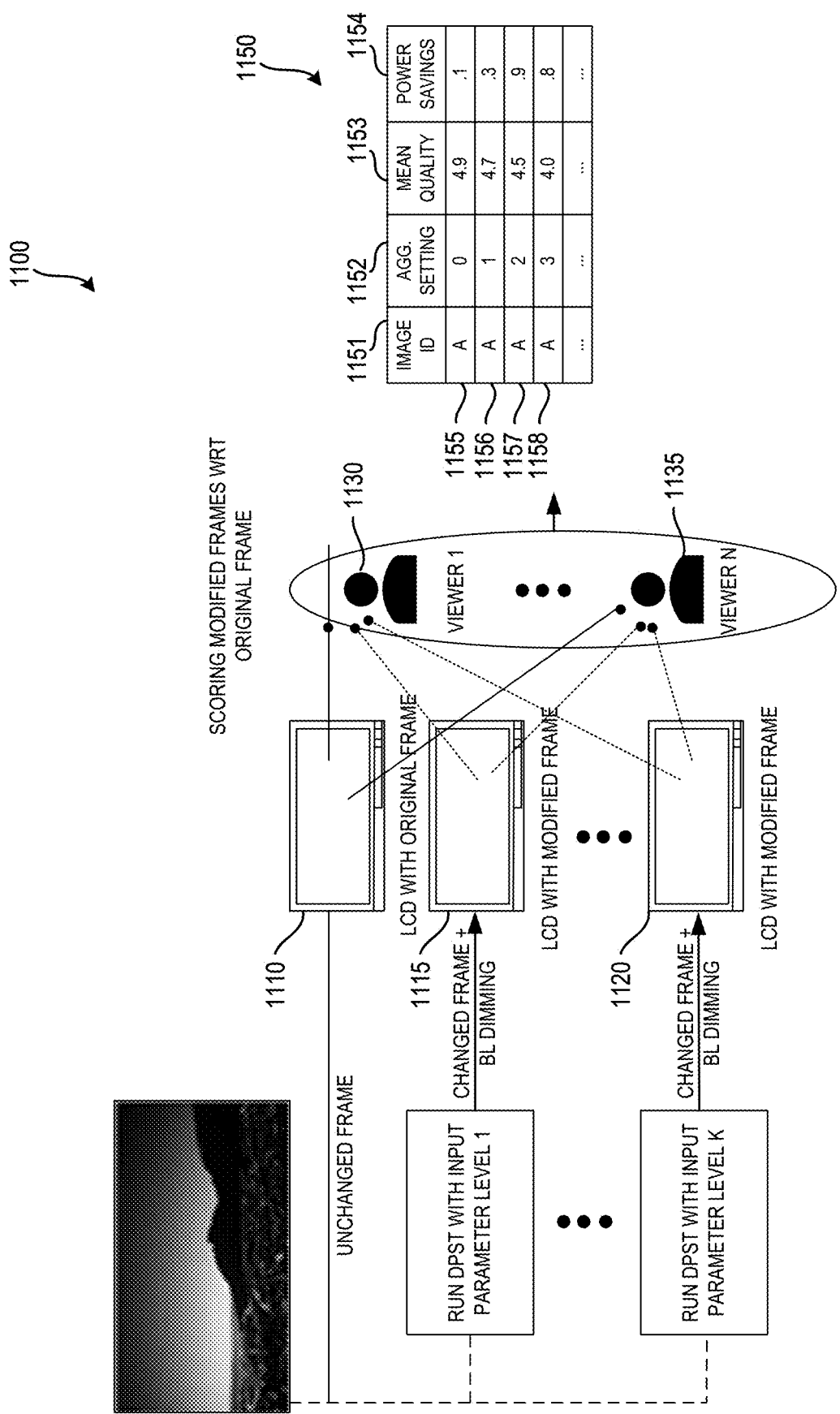
FIG. 11 is a block diagram illustrating the collection and labeling of training data.

FIG. 11 is a block diagram 1100 illustrating the collection and labeling of training data. Consider, for example, a power savings algorithm, such as DPST, which accepts a frame (e.g., an unmodified image), along with an aggressiveness value. In examples disclosed herein, the aggressiveness value is represented using an integer value in a range from 0 to k, with a value of 0 representing no power savings being applied, and k representing maximum power savings applied. Each frame from a training set will be passed through a display controller implementing the selected power savings algorithm with each possible aggressiveness value. As there can be k different aggressiveness values, there are a resulting 'k' modified frames 1115, 1120 for each original frame 1110. Each modified frame results in a value 'p', representing an amount of power savings. These frames are then displayed to viewers 1130, 1135 along with backlight dimming as recommended by the power saving algorithm. The viewers score these modified frames in range of 1 through 5 with respect to the original frame. From the viewer's scores, the mean score for each frame is computed, which is represented as a mean opinion score (MOS). The image and aggressiveness pair are selected such that the MOS is above a prescribed threshold (e.g., 4.5) and provides maximum display power savings. If none of the modified frames meet the MOS threshold, then an aggressiveness value of 0 is selected, meaning that the power savings should be disabled for that particular input frame.

The illustrated example of FIG. 11 includes a table 1150 that represents the result of the averaging of the opinion scores for each image and aggressiveness pair. The example table 1150 includes an image identifier column 1151, an aggressiveness value column 1152, a quality column 1153, and a power savings column 1154. The image identifier column 1151 identifies the image. The aggressiveness value column 1152 represents the aggressiveness value. The quality column 1153 represents the MOS value of the image and aggressiveness pair. The power savings column 1154 represents the power savings associated with the image and aggressiveness pair. The example table includes a first row 1155, a second row 1156, a third row 1157, and a fourth row 1158. In the illustrated example of FIG. 11, the image and aggressiveness pair represented by the third row 1157 is selected because it results in at least the threshold MOS value (e.g., an MOS value that is greater than or equal to 4.5), and results in a greater power savings than resulting from the image and aggressiveness pair represented by first row 1155 and the second row 1156 (which also satisfy the threshold MOS of 4.5). As a result, when training the machine learning model, an aggressiveness value of 2 is used in association with the image "A".

FIG. 12 is a flowchart representative of example machine-readable instructions that may be executed to generate an aggressiveness value for use by a display controller. The example process 1200 of the illustrated example of FIG. 12 begins when the example trigger detector circuitry 810 determines whether an aggressiveness value is to be generated. (Block 1210). The example triggered detector circuitry 810 may make such a determination based on, for example, an event (e.g., a scene change event being provided by the display controller 210 to the power savings controller 220). Alternatively, the trigger detector circuitry 810 may analyze images accessed by the image accessor circuitry 820 to determine whether a scene change has occurred.

In some examples, the trigger detector circuitry 810 may determine that an aggressiveness value is to be generated on a periodic basis. For example, the example trigger detector circuitry 810 may determine that an aggressiveness value is to be generated every frame, every three frames, every second, every ten seconds, every minute, etc. Having the trigger detector circuitry 810 use a short periodicity (e.g., triggering to generate an aggressiveness value every frame) may result in additional power being consumed by the power savings controller, although this additional power consumed is likely outweighed by the savings that can be achieved as a result of the use of the aggressiveness value.

Upon the trigger detector circuitry 810 determining that an aggressiveness value is to be created (e.g., block 1210 returning a result of YES), the example image accessor circuitry 820 then accesses an image provided to the display controller 210. (Block 1220). In some examples, the image is accessed by monitoring a data line from a GPU to the display controller 210. In some examples, the image is accessed by reading a memory of the display controller 210.

The example downscaler circuitry 830 performs downscaling of the accessed image. (Block 1230). In examples disclosed herein, the downscaling of the accessed image converts the accessed image from a first resolution to a second resolution having fewer pixels than the first resolution. In some examples, bicubic image downscaling is used. However, any other downscaling algorithm may additionally or alternatively be used. In some examples, the downscaler circuitry 830 may be implemented separately from the power savings controller 220. In such an example, the example image accessor circuitry 820 may instead access the downscaled image from the downscaler circuitry. Additionally or alternatively, downscaling of the image may be omitted entirely.

The example model executor circuitry 840 uses a model stored in the model datastore 850 and the downscaled image provided the by the downscaler circuitry 830 to generate an aggressiveness value. (Block 1240). In some examples, a single aggressiveness value is generated. However, in other examples, multiple aggressiveness values are generated to be provided to the display controller 210. Such multiple aggressiveness values may correspond to, for example, different types of power savings algorithms that may be implemented by the display controller 210.

The example aggressiveness provider circuitry 870 then provides the generated aggressiveness value(s) to the display controller 210. (Block 1250). In examples disclosed herein, the aggressiveness value(s) are provided as one or more digital values. However, in some examples, analog aggressiveness value(s) may instead be provided to the display controller 210. The example process 1200 of the illustrated example is then repeated.

Figure 13:
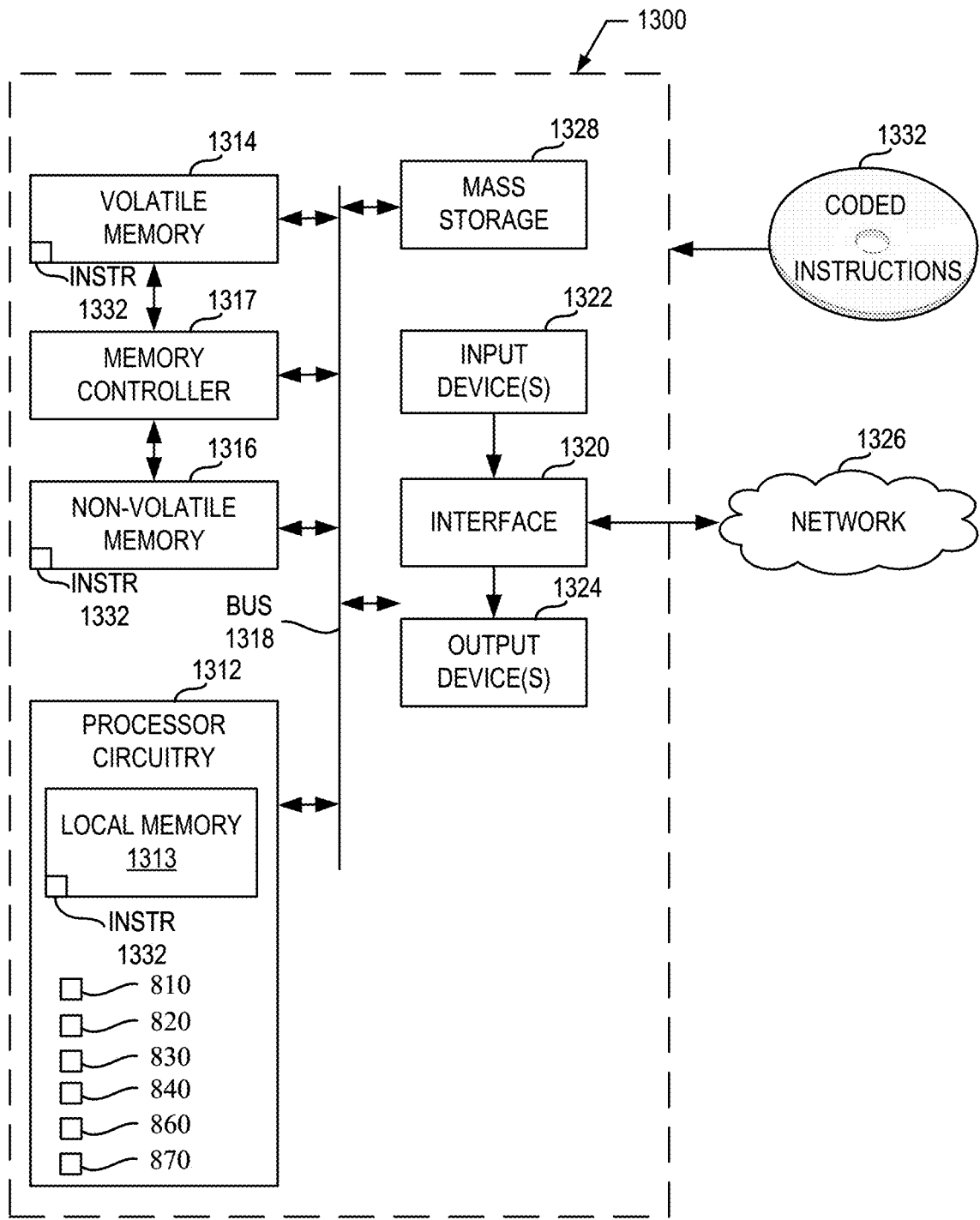
FIG. 13 is a block diagram of an example processing platform including processor circuitry structured to execute the example machine readable instructions of FIG. 10 to implement the example model creation and distribution system of FIG. 9.

FIG. 13 is a block diagram of an example processor platform 1300 structured to execute and/or instantiate the machine readable instructions and/or operations of FIG. 12 to implement the example power savings controller 220 of FIG. 8. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1300 of the illustrated example includes processor circuitry 1312. The processor circuitry 1312 of the illustrated example is hardware. For example, the processor circuitry 1312 can be implemented by one or more integrated circuits, logic circuits, FPGAs microprocessors, CPUs, GPUs, DSPs, and/or microcontrollers from any desired family or manufacturer. The processor circuitry 1312 may be implemented by one or more semiconductor based (e.g., silicon based) devices. In this example, the processor circuitry 1312 implements the example trigger detector circuitry 810, the example image accessor circuitry 820, the example downscaler circuitry 830, the example model executor circuitry 840, the example model controller circuitry 860, and the example aggressiveness provider circuitry 870.

The processor circuitry 1312 of the illustrated example includes a local memory 1313 (e.g., a cache, registers, etc.). The processor circuitry 1312 of the illustrated example is in communication with a main memory including a volatile memory 1314 and a non-volatile memory 1316 by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317.

The processor platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1322 are connected to the interface circuitry 1320. The input device(s) 1322 permit(s) a user to enter data and/or commands into the processor circuitry 1312. The input device(s) 1322 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1324 are also connected to the interface circuitry 1320 of the illustrated example. The output devices 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1300 of the illustrated example also includes one or more mass storage devices 1328 to store software and/or data. Examples of such mass storage devices 1328 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1332, which may be implemented by the machine readable instructions of FIG. 12, may be stored in the mass storage device 1328, in the volatile memory 1314, in the non-volatile memory 1316, and/or on a removable non-transitory computer readable storage medium such as a CD or DVD.

Figure 14:
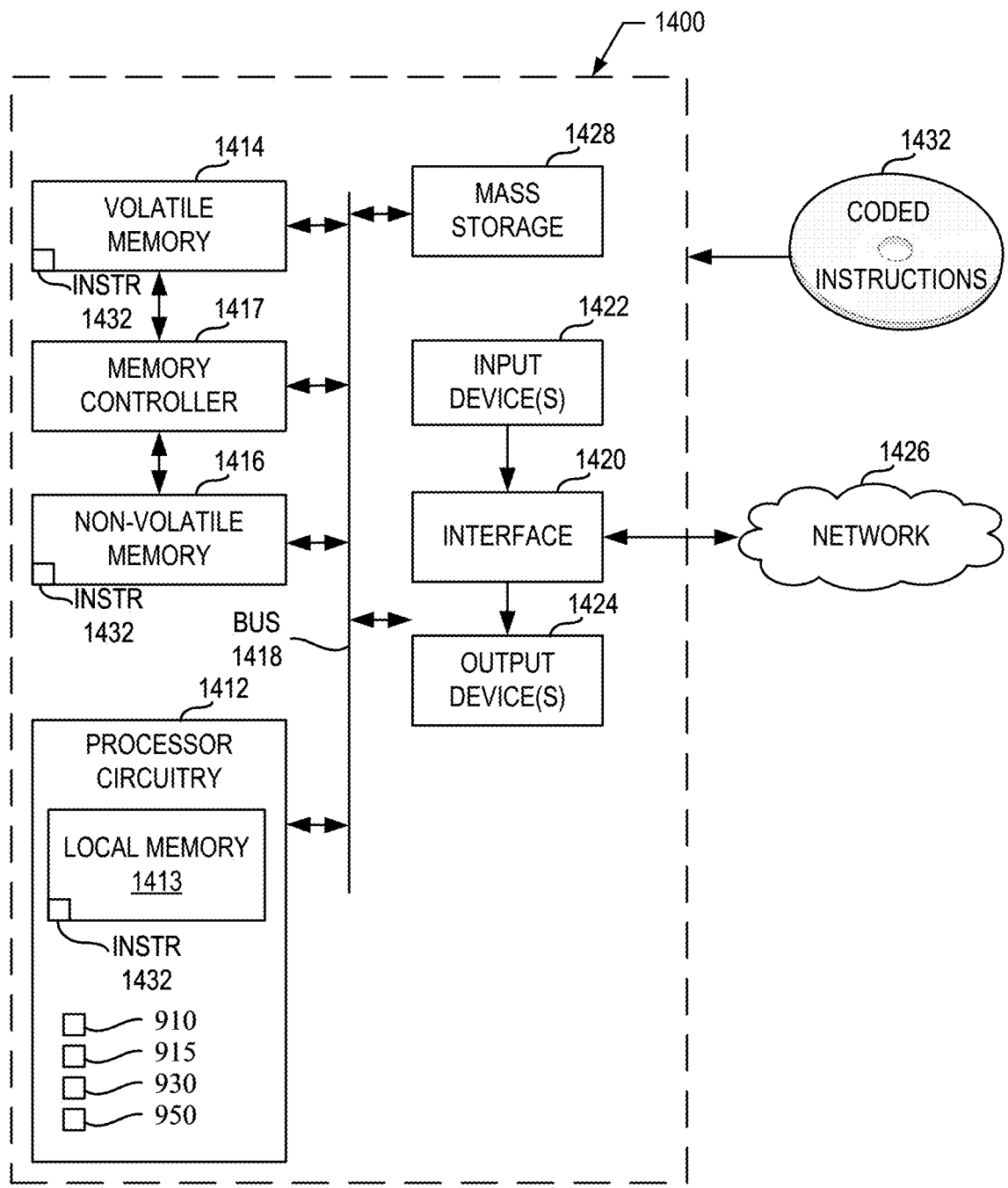
FIG. 14 is a block diagram of an example processing platform including processor circuitry structured to execute the example machine readable instructions of FIG. 12 to implement the example power savings controller of FIG. 8.

FIG. 14 is a block diagram of an example processor platform 1400 structured to execute and/or instantiate the machine readable instructions and/or operations of FIG. 10 to implement the model training and distribution system 710 of FIG. 9. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example training data collector circuitry 910, the example training data labeler circuitry 915, the example training controller circuitry 930, and the example model distributor circuitry 950.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 10 and/or 12, may be stored in the mass storage device 1428, in the volatile memory 1414, in the non-volatile memory 1416, and/or on a removable non-transitory computer readable storage medium such as a CD or DVD.

Figure 15:
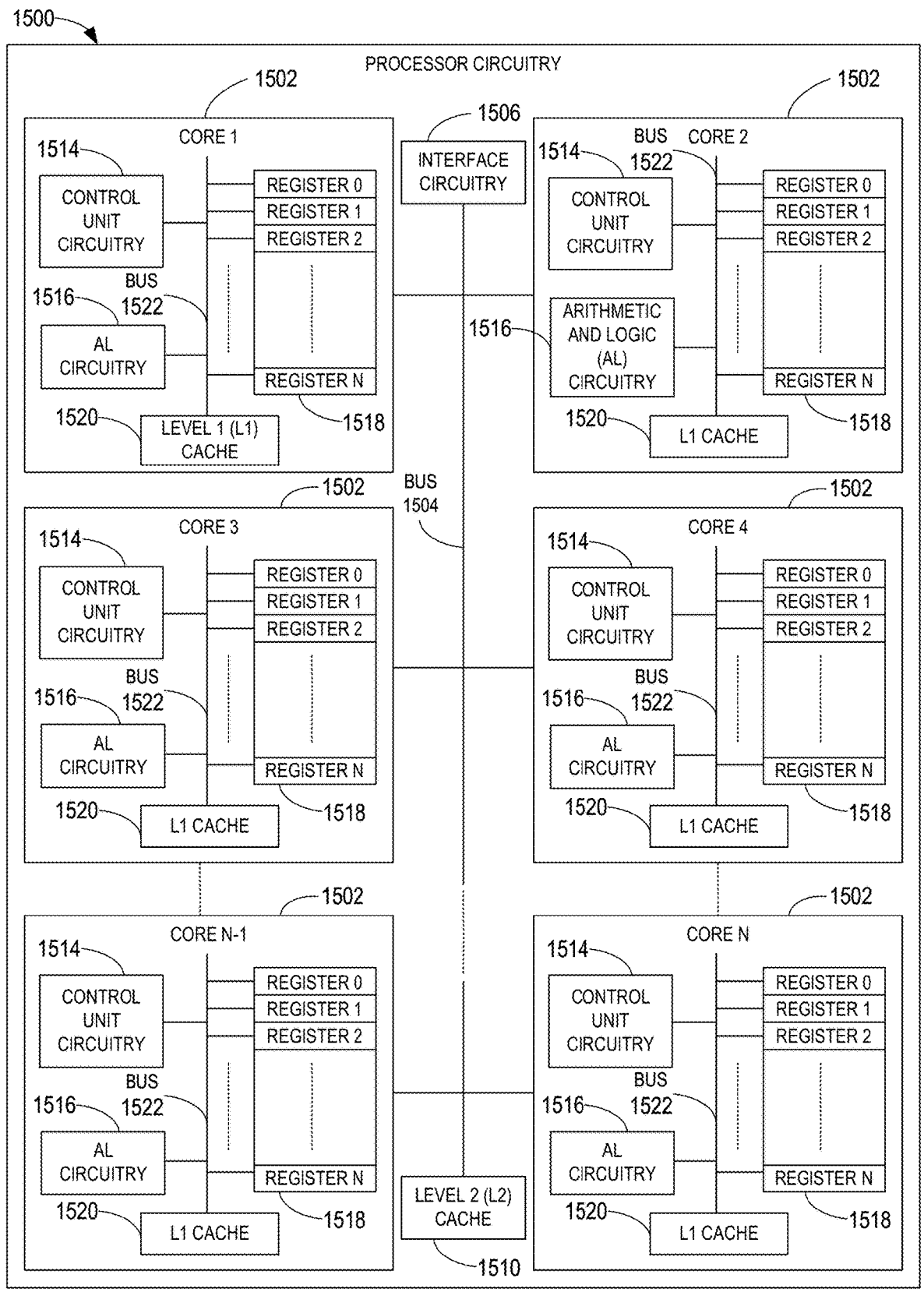
FIG. 15 is a block diagram of an example implementation of the processor circuitry of FIGS. 13 and/or 14.

FIG. 15 is a block diagram of an example implementation of the processor circuitry 1312 of FIG. 13 and/or the processor circuitry 1412 of FIG. 14. In this example, the processor circuitry 1312 of FIG. 13 and/or the processor circuitry 1412 of FIG. 14 is implemented by a microprocessor 1500. For example, the microprocessor 1500 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowchart of FIG. 15.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2 cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1314, 1316 of FIG. 13, the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1504 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
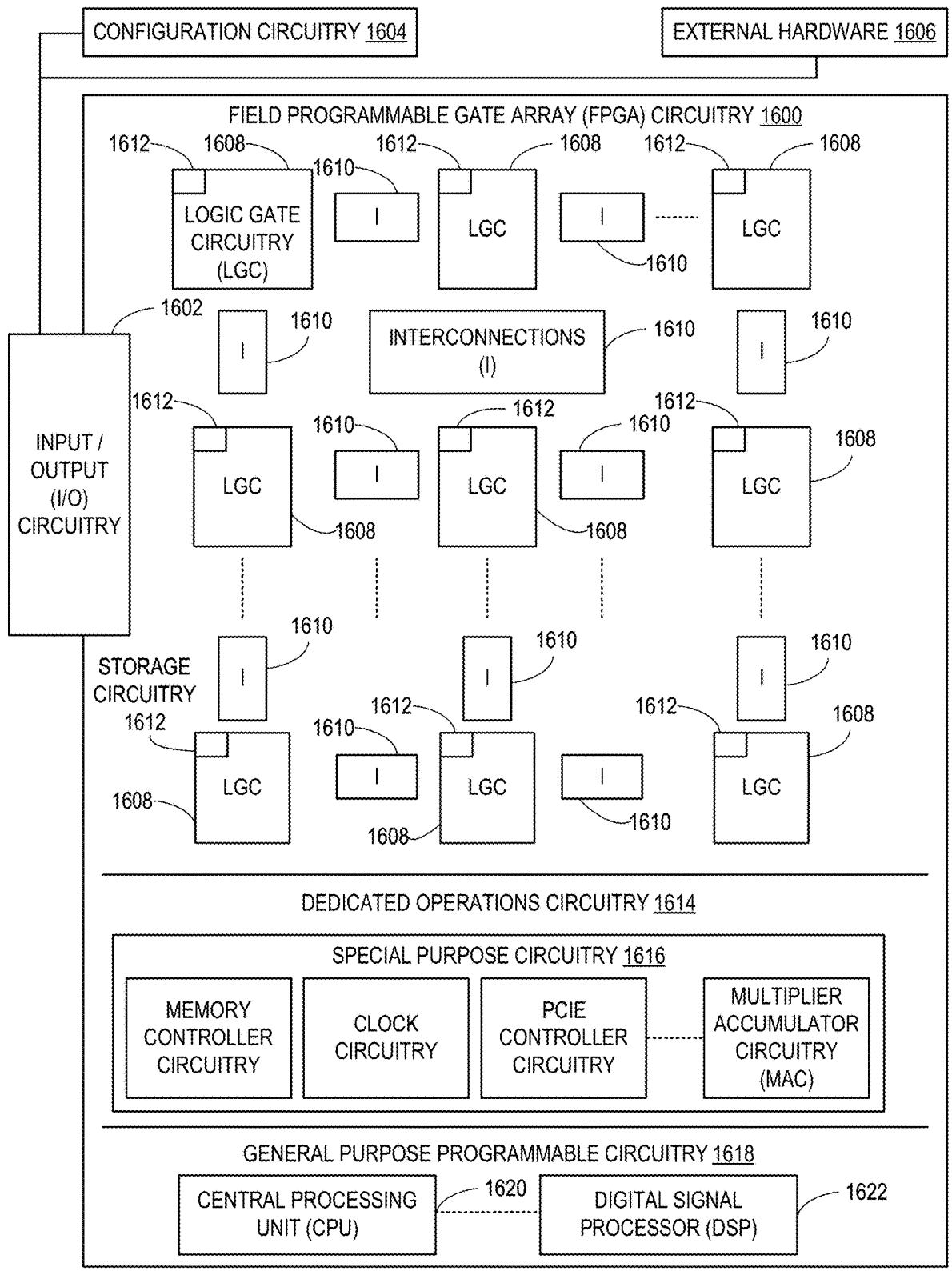
FIG. 16 is a block diagram of another example implementation of the processor circuitry of FIGS. 13 and/or 14.

FIG. 16 is a block diagram of another example implementation of the processor circuitry 1312 of FIG. 13 and/or the processor circuitry 1412 of FIG. 4. In this example, the processor circuitry 1312, 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowchart of FIGS. 10 and/or 12 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowcharts of FIGS. 10 and/or 12. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 10 and/or 12. As such, the FPGA circuitry 1600 may be structured to effectively instantiate some or all of the machine readable instructions of the flowcharts of FIGS. 10 and/or 12 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIG. 16 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 10 and/or 12 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1312 of FIG. 13 and/or the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1312 of FIG. 13 and/or the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowcharts of FIGS. 10 and/or 12 may be executed by one or more of the cores 1502 of FIG. 15 and a second portion of the machine readable instructions represented by the flowcharts of FIGS. 10 and/or 12 may be executed by the FPGA circuitry 1600 of FIG. 16.

In some examples, the processor circuitry 1312 of FIG. 13 and/or the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1312 of FIG. 13 and/or the processor circuitry 1412 of FIG. 14, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that enable low latency control of an aggressiveness of power savings algorithms used by a display controller. Use of such power savings systems reduces an amount of energy consumed by a computing device in which the power savings system is implemented, resulting in longer battery life. The disclosed systems, methods, apparatus, and articles of manufacture improve the efficiency of using a computing device by reducing power consumption, while maintaining at least a threshold level of display fidelity. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to control an aggressiveness of display panel power savings are disclosed herein. Further examples and combinations thereof include the following:

Example 1 includes an apparatus comprising a display panel, a display controller to adjust an image to be displayed by the display panel, and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrate Circuitry (ASIC) including logic gate circuitry to perform one or more third operations, the processor circuitry to perform at least one of the first operations, the second operations or the third operations to instantiate image accessor circuitry to access an image provided to the display controller, model executor circuitry to execute a machine learning model using the image as an input to generate an aggressiveness value, and aggressiveness provider circuitry to provide the aggressiveness value to the display controller, the display controller to adjust the image based on the aggressiveness value prior to display of the adjusted image by the display panel.

Example 2 includes the apparatus of example 1, further including downscaler circuitry to downscale the image prior to execution of the machine learning model by the model executor circuitry.

Example 3 includes the apparatus of example 2, wherein the downscaler circuitry is implemented separately from the processor circuitry.

Example 4 includes the apparatus of example 1, wherein the model executor circuitry is to execute the machine learning model in response to expiration of a timer.

Example 5 includes the apparatus of example 1, wherein processor circuitry is further to instantiate trigger detector circuitry, and the model executor circuitry is to execute the machine learning model in response to a scene change event.

Example 6 includes the apparatus of example 5, wherein the display controller is to provide the scene change event to the trigger detector circuitry.

Example 7 includes at least one non-transitory computer readable medium comprising instructions that, when executed, cause at least one processor to at least access an image to be displayed by the display controller, execute a machine learning model using the image as an input to generate an aggressiveness value, and provide the aggressiveness value to the display controller, the display controller to modify the image according to the aggressiveness value prior to display of the image by a display panel.

Example 8 includes the at least one non-transitory computer readable medium of example 7, further including downscaling the image prior to execution of the machine learning model.

Example 9 includes the at least one non-transitory computer readable medium of example 7, wherein the execution of the machine learning model is performed in response to expiration of a timer.

Example 10 includes the at least one non-transitory computer readable medium of example 7, wherein the execution of the machine learning model is performed in response to a scene change event.

Example 11 includes the at least one non-transitory computer readable medium of example 7, further including obtaining the machine learning model from a model training and distribution system.

Example 12 includes a method for creating a control input for a display controller, the method comprising accessing an image to be displayed by the display controller, executing a machine learning model using the image as an input to generate an aggressiveness value, and providing the aggressiveness value to the display controller, the display controller to adjust the image according to the aggressiveness value prior to display of the image by a display panel.

Example 13 includes the method of example 12, further including downscaling the image prior to execution of the machine learning model.

Example 14 includes the method of example 12, wherein the execution of the machine learning model is performed in response to expiration of a timer.

Example 15 includes the method of example 12, wherein the execution of the machine learning model is performed in response to a scene change event.

Example 16 includes the method of example 12, further including obtaining the machine learning model from a model training and distribution system.

Example 17 includes an apparatus comprising means for accessing an image to be displayed by a display panel, means for executing a machine learning model using the image as an input to generate an aggressiveness value, and means for providing the aggressiveness value to a display controller, the image to be modified by the display controller prior to being displayed by the display panel.

Example 18 includes the apparatus of example 17, further including means for downscaling to downscale the image prior to execution of the machine learning model.

Example 19 includes the apparatus of example 17, wherein the means for executing is to execute the machine learning model in response to expiration of a timer.

Example 20 includes the apparatus of example 17, wherein the means for executing is to execute the machine learning model in response to a scene change event detected by a means for triggering.

Example 21 includes the apparatus of example 20, wherein the display controller is to provide the scene change event to the means for triggering.

Example 22 includes a computing device comprising a display panel, a display controller to adjust an image to be displayed by the display panel, and a power savings controller to access an image provided to the display controller, execute a machine learning model using the image as an input to generate an aggressiveness value, and provide the aggressiveness value to the display controller, the display controller to adjust the image based on the aggressiveness value.

Example 23 includes the computing device of example 22, further including a downscaler to downscale the image prior to execution of the machine learning model by the power savings controller.

Example 24 includes the computing device of example 23, wherein the downscaler is implemented separately from the power savings controller.

Example 25 includes the computing device of example 22, wherein the power savings controller is to execute the machine learning model in response to expiration of a timer.

Example 26 includes the computing device of example 22, wherein power savings controller is to execute the machine learning model in response to a scene change event.

Example 27 includes the computing device of example 26, wherein the display controller is to provide the scene change event to the power savings controller.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a display panel;
a display controller to adjust an image to be displayed by the display panel; and
processor circuitry including one or more of:
at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus;
a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or
Application Specific Integrate Circuitry (ASIC) including logic gate circuitry to perform one or more third operations;
the processor circuitry to perform at least one of the first operations, the second operations or the third operations to instantiate:
image accessor circuitry to access an image provided to the display controller;
model executor circuitry to execute a machine learning model using the image as an input to generate an aggressiveness value; and
aggressiveness provider circuitry to provide the aggressiveness value to the display controller, the display controller to adjust the image based on the aggressiveness value prior to display of the adjusted image by the display panel.

2. The apparatus of claim 1, further including downscaler circuitry to downscale the image prior to execution of the machine learning model by the model executor circuitry.

3. The apparatus of claim 2, wherein the downscaler circuitry is implemented separately from the processor circuitry.

4. The apparatus of claim 1, wherein the model executor circuitry is to execute the machine learning model in response to expiration of a timer.

5. The apparatus of claim 1, wherein processor circuitry is further to instantiate trigger detector circuitry, and the model executor circuitry is to execute the machine learning model in response to a scene change event.

6. The apparatus of claim 5, wherein the display controller is to provide the scene change event to the trigger detector circuitry.

7. At least one non-transitory computer readable medium comprising instructions that, when executed, cause at least one processor to at least:
access an image to be displayed by the display controller;
execute a machine learning model using the image as an input to generate an aggressiveness value; and
provide the aggressiveness value to the display controller, the display controller to modify the image according to the aggressiveness value prior to display of the image by a display panel.

8. The at least one non-transitory computer readable medium of claim 7, further including downscaling the image prior to execution of the machine learning model.

9. The at least one non-transitory computer readable medium of claim 7, wherein the execution of the machine learning model is performed in response to expiration of a timer.

10. The at least one non-transitory computer readable medium of claim 7, wherein the execution of the machine learning model is performed in response to a scene change event.

11. The at least one non-transitory computer readable medium of claim 7, further including obtaining the machine learning model from a model training and distribution system.

12. A method for creating a control input for a display controller, the method comprising:
accessing an image to be displayed by the display controller;
executing a machine learning model using the image as an input to generate an aggressiveness value; and
providing the aggressiveness value to the display controller, the display controller to adjust the image according to the aggressiveness value prior to display of the image by a display panel.

13. The method of claim 12, further including downscaling the image prior to execution of the machine learning model.

14. The method of claim 12, wherein the execution of the machine learning model is performed in response to expiration of a timer.

15. The method of claim 12, wherein the execution of the machine learning model is performed in response to a scene change event.

16. The method of claim 12, further including obtaining the machine learning model from a model training and distribution system.

17. An apparatus comprising:
means for accessing an image to be displayed by a display panel;
means for executing a machine learning model using the image as an input to generate an aggressiveness value; and
means for providing the aggressiveness value to a display controller, the image to be modified by the display controller prior to being displayed by the display panel.

18. The apparatus of claim 17, further including means for downscaling to downscale the image prior to execution of the machine learning model.

19. The apparatus of claim 17, wherein the means for executing is to execute the machine learning model in response to expiration of a timer.

20. The apparatus of claim 17, wherein the means for executing is to execute the machine learning model in response to a scene change event detected by a means for triggering.

21. The apparatus of claim 20, wherein the display controller is to provide the scene change event to the means for triggering.

* * * * *